United States Patent
Irisawa et al.

(10) Patent No.: US 7,643,750 B2
(45) Date of Patent: Jan. 5, 2010

(54) PHOTOGRAPHING APPARATUS WITH IMAGE-BLUR SUPPRESSION MECHANISM

(75) Inventors: Shigeru Irisawa, Chigasaki (JP); Atsushi Sato, Yokohama (JP); Takehide Ohno, Yokohama (JP); Koichi Muramatsu, Yokohama (JP)

(73) Assignee: Ricoh Company, Ltd., Tokyo (JP)

( * ) Notice: Subject to any disclaimer, the term of this patent is extended or adjusted under 35 U.S.C. 154(b) by 357 days.

(21) Appl. No.: 11/583,904

(22) Filed: Oct. 20, 2006

(65) Prior Publication Data

US 2007/0154195 A1 Jul. 5, 2007

(30) Foreign Application Priority Data

Oct. 20, 2005 (JP) ............... 2005-305840

(51) Int. Cl.
*G03B 17/00* (2006.01)
(52) U.S. Cl. .......................... 396/542; 396/55
(58) Field of Classification Search ............. 396/50, 396/52, 55, 542; 348/208.99, 208.4, 208.5, 348/208.7, 373–375
See application file for complete search history.

(56) References Cited

U.S. PATENT DOCUMENTS

| | | | |
|---|---|---|---|
| 3,979,763 A * | 9/1976 | Mills | 396/350 |
| 4,945,368 A | 7/1990 | Ishino et al. | |
| 5,682,563 A | 10/1997 | Shinohara et al. | |
| 7,106,959 B2 | 9/2006 | Sato | |
| 7,355,630 B2 * | 4/2008 | Uenaka et al. | 348/208.2 |
| 2002/0126210 A1 | 9/2002 | Shinohara et al. | |
| 2004/0021792 A1 * | 2/2004 | Yasui | 348/373 |
| 2005/0232617 A1 * | 10/2005 | Uenaka et al. | 396/55 |
| 2007/0127915 A1 * | 6/2007 | Lu et al. | 396/542 |
| 2007/0189744 A1 * | 8/2007 | Huang | 396/55 |

FOREIGN PATENT DOCUMENTS

| | | |
|---|---|---|
| JP | 2002-116476 | 4/2002 |
| JP | 2004-177812 | 6/2004 |
| JP | 2004-274242 | 9/2004 |
| JP | 2005-092141 | 4/2005 |
| JP | 2005-92141 | 4/2005 |
| JP | 2005-190337 | 7/2005 |
| JP | 2005-242256 | 9/2005 |
| JP | 2005-274633 | 10/2005 |
| JP | 2005-286901 | 10/2005 |
| JP | 2005-293992 | 10/2005 |
| JP | 2005-294511 | 10/2005 |
| JP | 2005-305841 | 11/2005 |
| JP | 2006-251162 | 9/2006 |

\* cited by examiner

*Primary Examiner*—W B Perkey
*Assistant Examiner*—Minh Q Phan
(74) *Attorney, Agent, or Firm*—Dickstein Shapiro LLP

(57) ABSTRACT

A photographing apparatus which performs an image-blur suppression properly even through a computation device disposed in a main body of the photographing apparatus and a photographing element movable along an XY plane are electrically connected is provided according to the present invention. The image-blur suppression mechanism comprises a flexible base plate 20 including a second linear part 210 and a fourth linear part 212 which are plastically deformed along Z axial direction, meeting such a condition that an intersection line between a plane containing the second linear part 210 and the XY plane and an intersection line between a plane containing the fourth linear part 212 and the XY plane are intersected with XY axes, respectively.

20 Claims, 33 Drawing Sheets

PHOTOGRAPHING APPARATUS WITH IMAGE-BLUR SUPPRESSION MECHANISM

The present application claims the priority benefit of Japanese Patent Application 2005-305840 filed on Oct. 20, 2005, the contents of which are incorporated herein by reference.

BACKGROUND OF THE INVENTION

1. Field of the Invention

The present invention relates to a photographing apparatus which obtains a subject image by forming the subject image on a photographing element used for producing image data, especially to a photographing apparatus with an image-blur suppression mechanism to take a subject image with image blurring suppressed or compensated by moving the photographing element to follow the subject image moved by a camera shake.

2. Description of Related Art

Heretofore, as disclosed in Japan Patent Laid-Open No. 2004-274242, there is known a photographing apparatus, for example a digital camera, which is provided with an image-blur suppression mechanism. The photographing apparatus includes a CCD as a photographing element, a holding tube mounted to a main body of the photographing apparatus for housing a lens barrel at a photographing optical axis, a mount stage which is disposed at one end of the holding tube for mounting the CCD thereon, and a computation device disposed in the main body.

The mount stage is held at a guide stage, which is fixed in the main body with respect to the photographing optical axis, in such a way that the mount stage is movable on the guide stage by a magnetic force from a permanent magnet and a coil opposing to the permanent magnet along an XY plane which is perpendicular to the photographing optical axis as Z axis.

The computation device, which is connected to the CCD electrically, determines inclinations of the main body at X and Y axial directions and controls the CCD to follow a displacement of the subject image caused by a camera shake through varying an electric voltage applied to the coil based on the inclination determination result. The computation device performs an image formation process and an image display process etc. based on image signals output from the CCD.

For the above mentioned digital camera with an image-blur suppression mechanism, since the computation device is disposed in the main body, there occurs a variation on a relative distance between the CCD and the computation device when the image-blur suppression is performed by moving the CCD along the XY plane, thus there has been proposed a flexible base plate to connect the CCD and the computation device therewith.

However, since the movement of the CCD for the image-blur suppression is a minute position adjustment performed by the magnetic force from the permanent magnet and the coil opposing to the permanent magnet, a deformation force resulted from a bending deformation of the flexible base plate corresponding to the variation on the relative distance between the CCD and the computation device may become a hindrance to the proper movement of the CCD, thus there arises a problem that the image-blur suppression may not be performed properly.

SUMMARY OF THE INVENTION

The present invention has been accomplished in view of the aforementioned problems and it is, therefore, an object of the present invention to provide a photographing apparatus with an image-blur suppression mechanism which performs image blurring suppression properly when a computation device disposed in a main body of the photographing apparatus and a photographing element to be movable along an XY plane are electrically connected.

To accomplish the objective described above, there is provided a photographing apparatus according to the present invention comprising an image-blur suppression mechanism which moves a photographing element on a photographing plane of which a subject image is formed in an XY plane which is parallel to the photographing plane to follow a displacement of the subject image caused by the camera shake based on a target value obtained by setting an intersection point of Z axis which is a photographing optical axis and the photographing plane which is perpendicular to Z axis as a zero point to calculate a displacement amount of the subject image which is caused by the camera shake detected on a main body from the zero point as the target value; a computation device which is provided in the main body to process signals from the photographing element and drive the image-blur suppression mechanism; and a flexible base plate which is disposed in the main body with one end connected to the photographing element and the other end fixed relative to the photographing optical axis for connecting the computation device, wherein the flexible base plate includes a connection extension section which is extended to connect the one end to the other end and has a first extension part which is extended along the XY plane starting from the one end, a second extension part which is connected to the first extension part extending toward the subject viewing from the photographing element, a third extension part which is connected to the second extension part extending parallel to the XY plane, and a fourth extension part which is connected to the third extension part extending in a direction away from the subject viewing from the photographing element; the connection extension section is folded through a plastic deformation to form a folding line between the first and second extension parts, the second and third extension parts, the third and fourth extension parts, and the fourth extension part and the other end, respectively; and an intersection line between a plane containing the second extension part and the XY plane and an intersection line between a plane containing the fourth extension part and the XY plane are intersected with XY axes, respectively.

BRIEF DESCRIPTION OF THE DRAWINGS

FIG. 6 is a view showing a principle of an image-blur suppression of the digital camera according to the present invention, wherein

FIG. 9 is a rear view of the holding tube in FIG. 7, wherein

FIG. 12 is an explanatory view showing a zero point retention mechanism according to the present invention, wherein

FIG. 13 is a schematic diagram showing a cam groove of a rotation transmitting gear, wherein

FIG. 14 is an explanatory view showing a fitted state between a holding pin and a recess portion, wherein

FIG. 18 is a perspective view schematically showing a disposition relationship between the CCD stage and the flexible base plate, wherein

DETAILED DESCRIPTION OF THE PREFERRED EMBODIMENTS

Hereinafter, a digital camera as a photographing apparatus with an image-blur suppression mechanism according to the present invention will be described in detail with reference to the drawings. Herein, the image-blur suppression mechanism is a mechanism used to suppress or compensate image blurring which occurs when the digital camera loses its stability which is usually caused by for example a camera shake.

1. General Configuration of the Digital Camera

Figure 1:
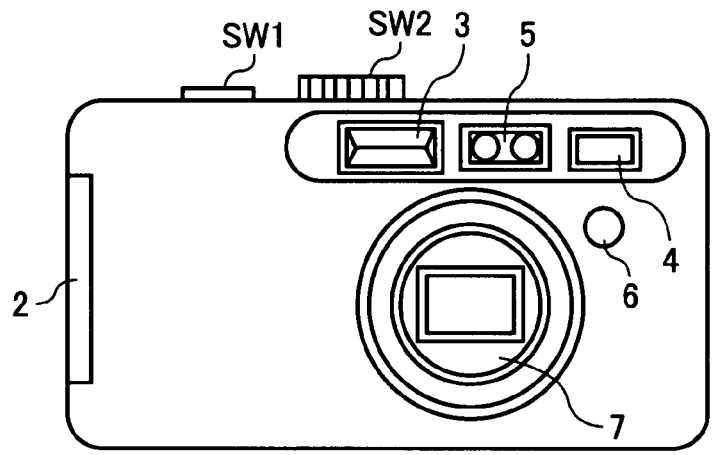
FIG. 1 is a front view of a digital camera according to the present invention.
Figure 2:
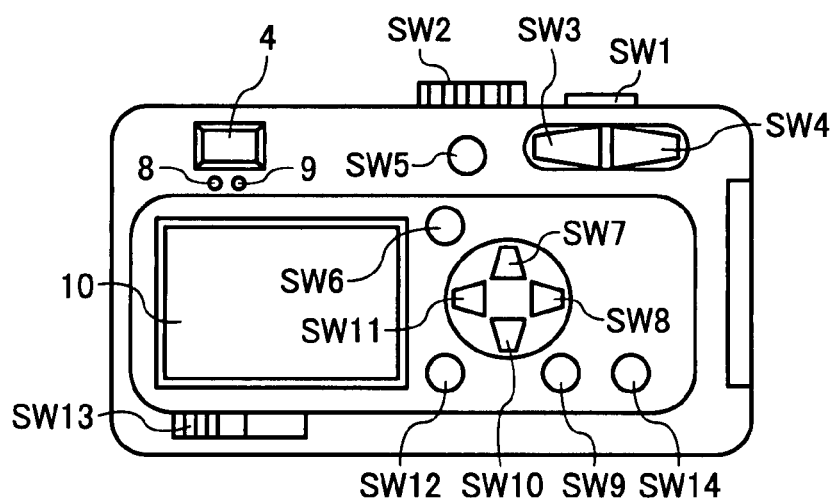
FIG. 2 is a rear view of the digital camera according to the present invention.
Figure 3:
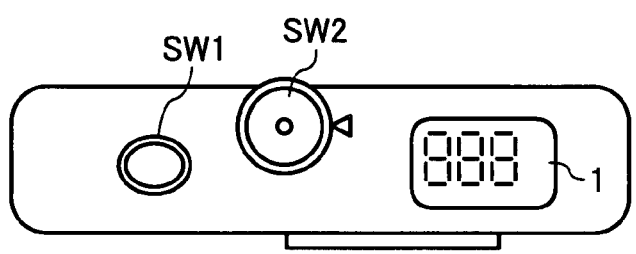
FIG. 3 is a top view of the digital camera according to the present invention.
Figure 4A:
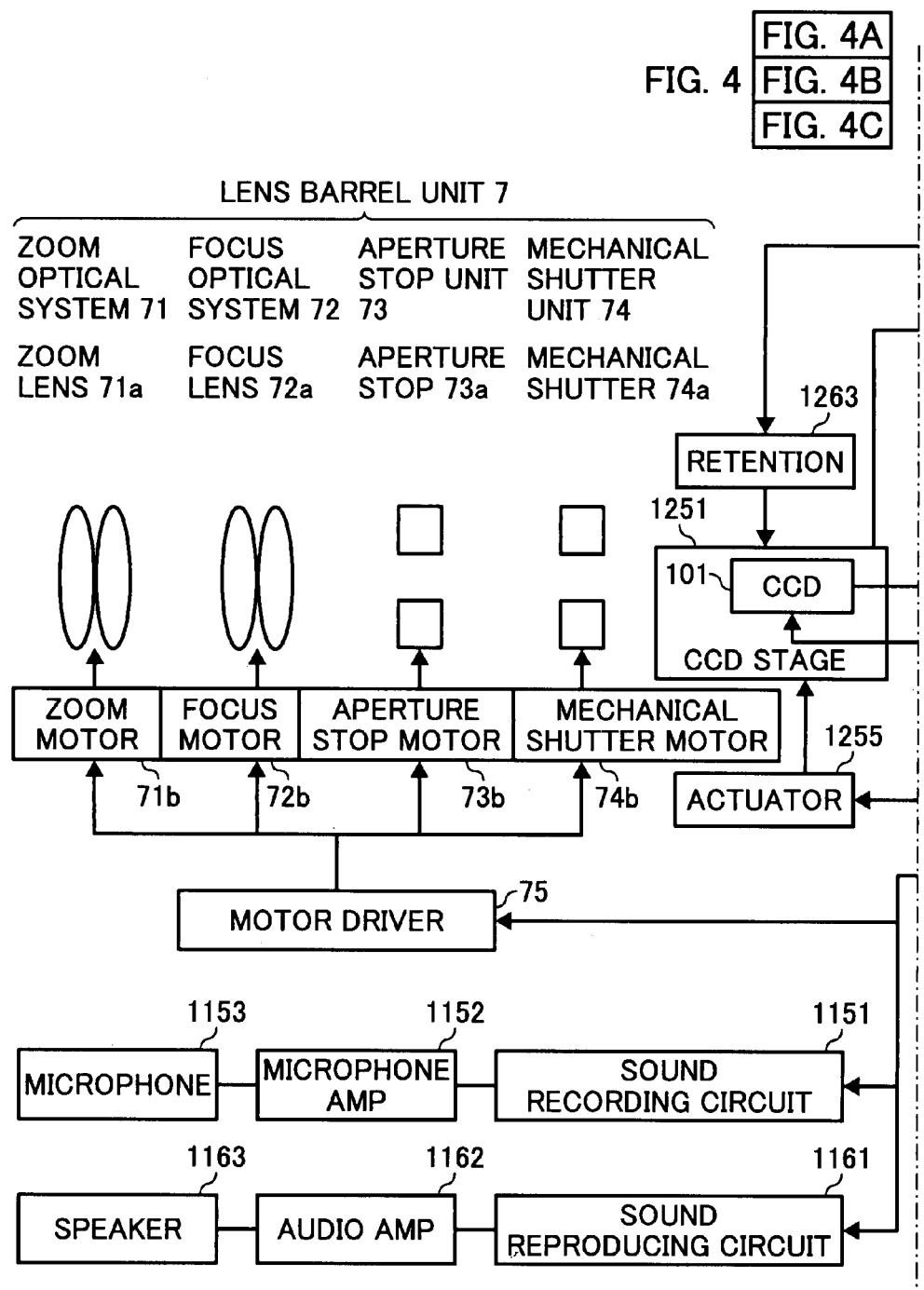
FIG. 4 is a circuit block view schematically showing an inner system configuration of the digital camera according to the present invention.
Figure 4B:
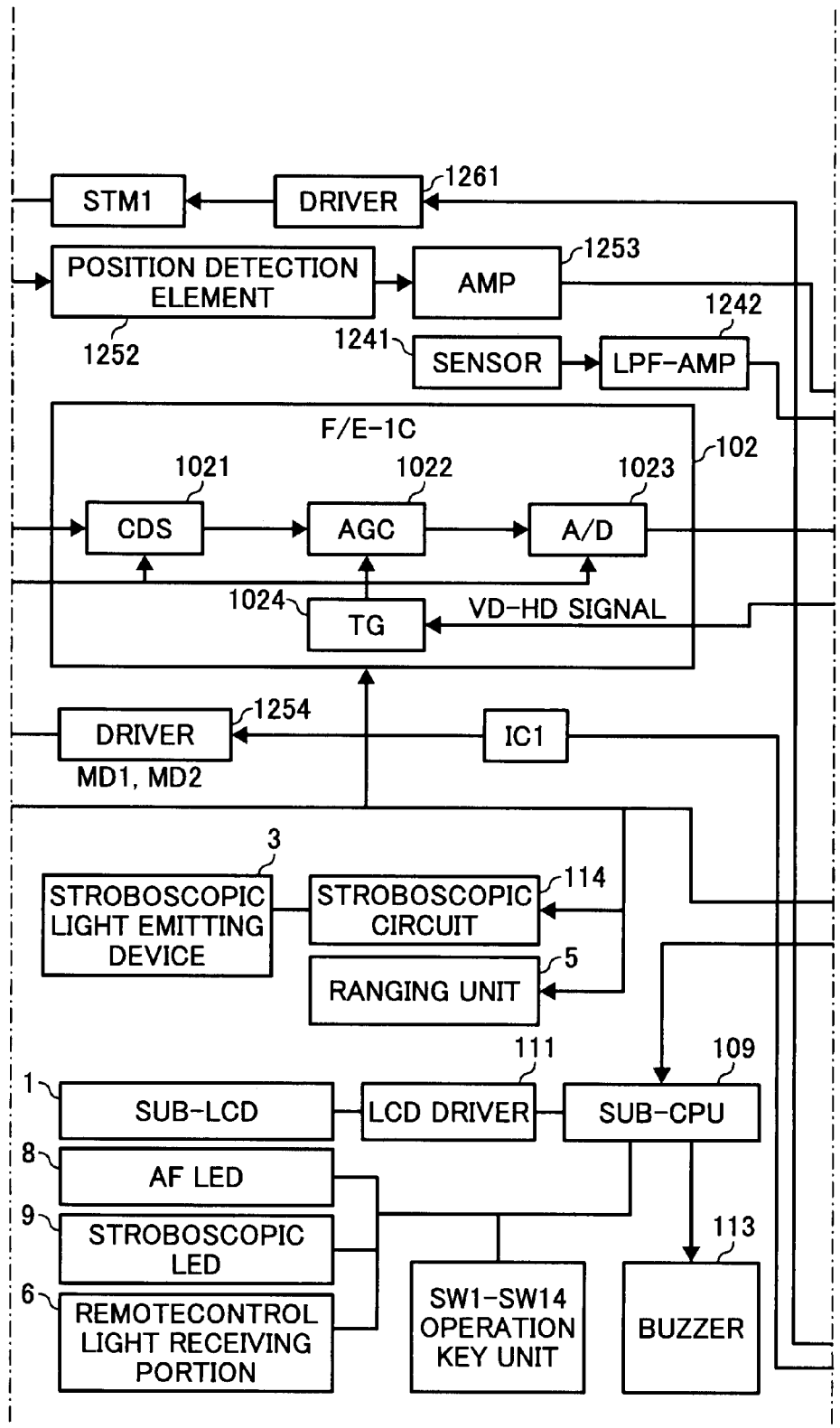
Figure 4C:
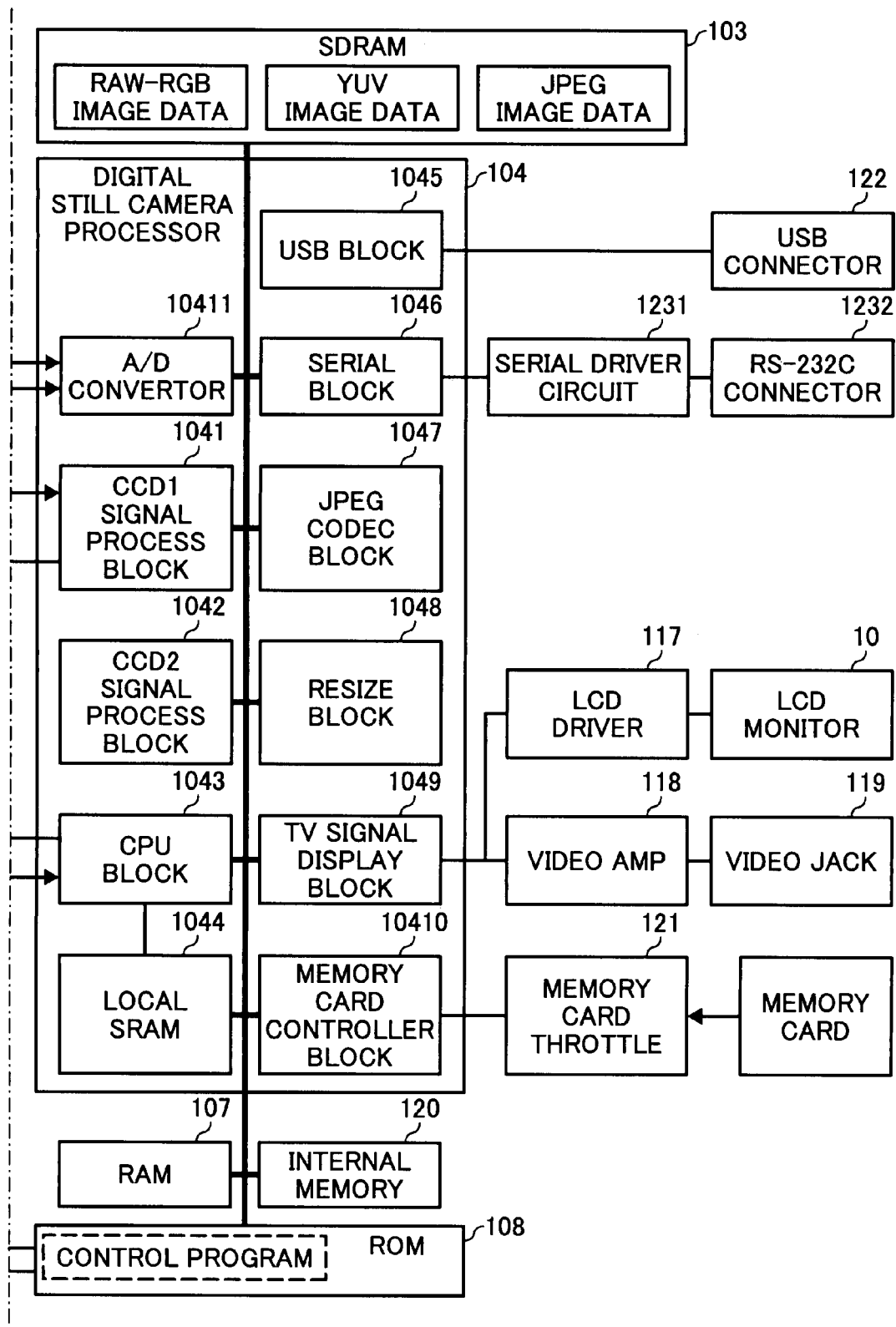

FIG. 1, FIG. 2 and FIG. 3 show a front view, a rear view and a top view respectively of the digital camera (hereinafter, referred to as the camera) according to the present invention and FIG. 4 is a circuit block view schematically showing an inner system configuration of the digital camera.

A top surface of a main body of the camera is provided with a release switch (release shutter) SW1 and a mode dial SW2 as shown in FIG. 1 and a sub liquid crystal display (abbreviated as sub LCD) 1 as shown in FIG. 3.

As shown in FIG. 1, a front surface of the main body of the camera is provided with a lens barrel unit 7 including a photographing lens, an optical finder 4, a strobe light unit 3, a ranging unit 5, a remote control light-receiving unit 6 and a lid of SD card/battery room 2.

As shown in FIG. 2, a back surface of the camera DCa is provided with a power switch SW13, an LCD monitor 10, an AF LED 8, a strobe LED 9, the optical finder 4, a wide-angle zoom switch SW3, a telescopic zoom switch SW4, a self-timer set/reset switch SW5, a menu switch SW6, an upward/strobe switch SW7, a rightward switch SW8, a display switch SW9, a downward/macro switch SW10, a leftward/image confirmation switch SW11, an OK switch SW12 and an image-blur suppression switch SW14.

Since functions or actions of the above mentioned members are well known in the art, descriptions of them are omitted, thus an inner system configuration of the camera will be described in the following.

2. Inner System Configuration of the Camera

As shown in FIG. 4, numeral 104 represents a digital still camera processor (hereinafter referred to as a processor).

The processor 104 comprises a A/D converter 10411, a CCD1 signal processing block 1041, a CCD2 signal processing block 1042, a CPU block 1043, a local SRAM 1044, a USB block 1045, a serial block 1046, a JPEG CODEC block 1047 which performs JPEG compression and decompression of an image data, a RESIZE block 1048 which scales up or down the image data through interpolation, a TV signal display block 1049 which converts the image data into a video signal so as to display the image on an external display device such a liquid crystal display or TV etc., and a memory card controller block 10410. These blocks are connected with each other by a bus line.

An outside of the processor 104 is provided with a SDRAM 103 which stores RAW-RGB data, YUV data and JPEG data of the image and the SDRAM is connected to the processor 104 via a memory controller (not shown) and a bus line.

The outside of the processor 104 is further provided with a RAM 107, an embedded memory 120 which stores a photographed image data even if an external memory card is not loaded and a ROM 108 which stores a controlling program, and these are also connected to the processor 104 via a bus line.

The controlling program is loaded to a main memory (not shown) of the processor 104 when the power switch SW13 is set ON. The processor 104 performs an action control on each unit according to the controlling program and stores a control data and a parameter etc. temporarily in the RAM 107.

The lens barrel unit 7 comprises a lens barrel which includes a zoom optical system 71 having a zoom lens 71a, a focus optical system 72 having a focus lens 72a, an aperture stop unit 73 having an aperture stop 73a and a mechanical shutter optical system 74 having a mechanical shutter 74a.

The zoom optical system 71, the focus optical system 72, the aperture stop unit 73 and the mechanical shutter optical system 74 are driven by a zoom motor 71b, a focus motor 72b, an aperture stop motor 73b and a mechanical shutter motor 74b, respectively.

These motors are driven by a motor driver 75 which is controlled by the CPU block 1043 of the processor 104.

A subject image is formed on the CCD 101 through each lens system of the lens barrel unit 7. The CCD 101 converts the subject image into an image signal, and outputs the image signal to an F/F-IC 102. The F/E-IC102 includes a CDS 1021 which performs a correlated double sampling to eliminate image noise, an AGC 1022 which performs automatic gain control and an A/D converting unit 1023 which converts an analogue image signal to the digital one.

That is to say, the F/F-IC 102 performs a predefined processing on the image signal and converts it from the analogue signal to the digital signal, then outputs the digital signal to the CCD1 signal processing block 1041 of the processor 104.

These signal processing operations are performed via a TG 1024 according to a vertically synchronized signal VD and a horizontally synchronized signal HD outputted from the CCD1 signal processing block 1041 of processor 104. The TG 1024 generates a driving timing signal based on the vertically synchronized signal VD and the horizontally synchronized signal HD.

The CPU block 1043 of the processor 104 is configured to control a sound recording circuit 1151 which performs a sound recording operation. A sound is converted to a sound recording signal by a microphone 1153 and amplified by a microphone amplifier 1152. The sound recording circuit 1151 records the amplified signal according to a command.

The CPU block 1043 also controls operations of a sound reproduction circuit 1161. The sound reproduction circuit 1161 is configured to output sound signals stored in a proper memory according to a command to an audio amplifier 1162 and reproduce the sound signals from a speaker 1163.

Furthermore, the CPU block 1043 controls a strobe light circuit 114 for making the strobe light unit 3 emit lights. In addition, the CPU block 1043 also controls the ranging unit 5.

The CPU block 1043 is connected to a sub-CPU 109 of the processor 104 and the sub CPU 109 controls displaying on the sub LCD 1 via a CCD driver 111. The sub CPU 109 is further connected with the AF LED 8, the strobe LED 9, the remote-control light-receiving unit 6, an operation key unit having the operation switches SW1 to SW14, and a buzzer 113.

The USB block 1045 is connected to a USB connector 122, and the serial block 1046 is connected to a RS-232C connector 1232 through a serial driver circuit 1231. The TV signal display block 1049 is connected to the LCD monitor 10 via an LCD driver 117 and to a video jack 119 for connecting the camera to an external display device such as TV and the like via a video amplifier 118 which converts the TV signal output from the TV signal display block 1049 to a signal of an impedance 75 Ω. The memory card controller block 10410 is connected to a contact point between a memory card throttle 121 and a memory card.

The LCD driver 117 functions not only to drive the LCD monitor 10 but also to convert the TV signal output from the TV signal display block 1049 to a signal to be displayed on the LCD monitor 10. The LCD monitor 10 is used to monitor the subject state before photographing, confirm a photographed image and display a photographed image stored in the memory card or the embedded memory 120.

The main body of the camera is disposed with a holding tube (to be described hereinafter) which constitutes a part of the lens barrel unit 7. The holding tube is provided with a CCD stage 1251 movable along an XY plane. The CCD 101 is mounted at the CCD stage 1251 which is included in the image-blur suppression mechanism, a detailed mechanical configuration of which will be described hereinafter.

The CCD stage 1251 is driven by an actuator 1255 which is hence controlled by a driver 1254 including coil drives MD1 and MD2. The driver 1254 is connected to an analogue-digital converter circuit IC1 which is then connected to the ROM 108 and receives the control data from the ROM 108.

The holding tube is provided with a zero point retention mechanism 1263 to retain the CCD stage 1251 at the zero point when the image-blur suppression switch SW14 and the power switch SW13 are off. The zero point retention mechanism 1263 is controlled by an actuator, such as a stepping motor STM1 driven by a driver 1261 to which the control data from the ROM 108 is output.

The CCD stage 1251 is attached with a position detecting element 1252, which outputs a detected result to an amplifier 1253 to be amplified and output to the A/D converter 10411. A gyro sensor 1241 is disposed in the main body of the camera to detect rotations along the X and Y axial directions, and a detected result from the gyro sensor 1241 is output to the A/D converter 10411 via a low-pass filter and amplifier 1242.

3. General Operations of the Camera

Figure 5:
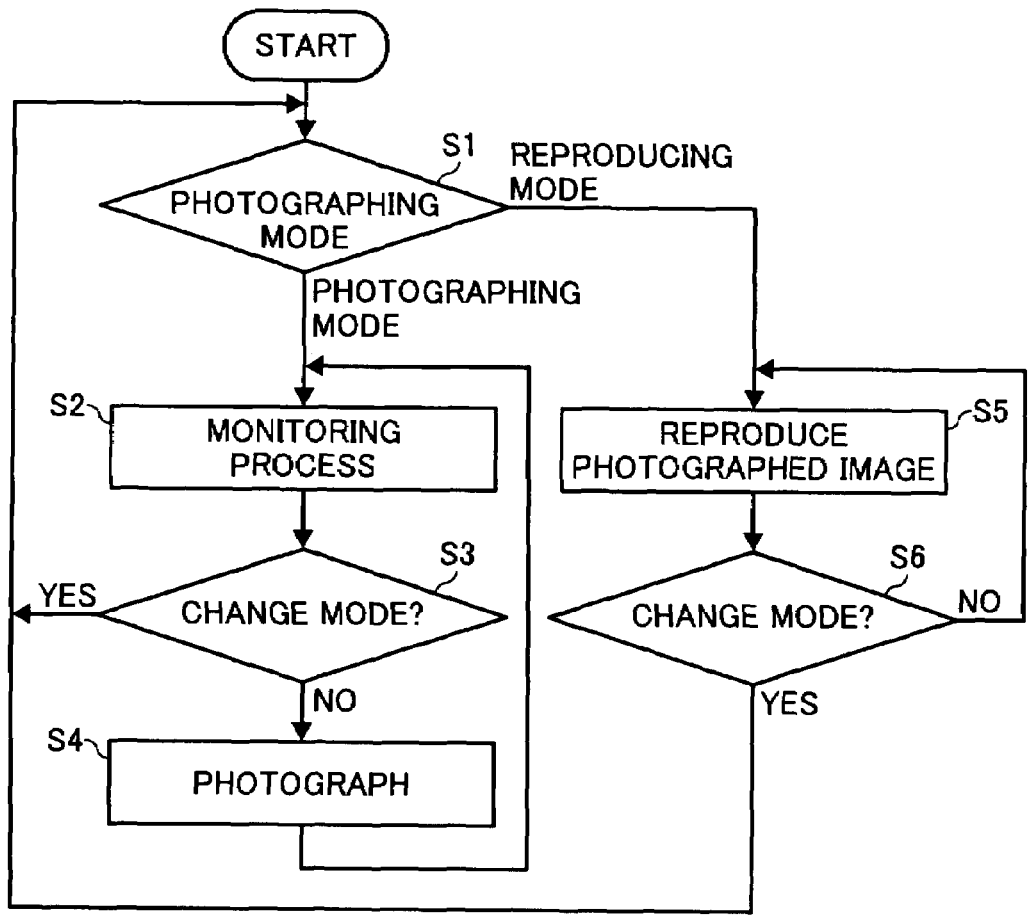
FIG. 5 is a flow chart schematically explaining a general operation of the digital camera according to the present invention.

The processor 104 determines whether the mode dial SW2 is set to a photographing mode or a replay mode (Step S1 in FIG. 5). If the mode dial SW2 is set to the photographing mode, the camera will be started in the photographing mode. While if the mode dial SW2 is set to the replay mode, the camera will be started in the replay mode.

Also as shown in FIG. 4, the processor 104 controls the motor driver 75 to move the lens barrel of the lens barrel unit 7 to a proper photographing position. Furthermore, the processor 104 controls to apply the power to each circuit of the CCD 101, F/E-IC 102 and LCD monitor 10 etc for a ready operation to start a finder mode.

In the finder mode, incoming lights to the CCD 101 through each lens system are photo-electrically converted into RGB analog signals and transmitted to the F/E-IC 102 including the CDS circuit 1021, the AGC 1022 and the A/D converter 1023. The A/D converter 1023 converts the analog signals to digital signals, and the digital signals are converted to YUV signals by a YUV converter disposed in a digital signal processor IC (the SDRAM 103) and written into a frame memory by the memory controller not shown.

The YUV signals are retrieved by the memory controller, and sent to a TV (not shown) or the LCD monitor 10 through the TV signal display block 1049 for a display of the photographed image. This processing is performed at an interval of ⅟₃₀seconds, thus the display of the photographed image in the finder mode will be renewed at every ⅟₃₀seconds. In other words, a monitoring processing is performed here (Step S2 in FIG. 5). Next, whether or not the mode dial SW2 has been switched is determined (Step S3 in FIG. 5). If the mode dial SW2 remains in the photographing mode, a photographing processing is performed through operations of the release switch SW1 (Step S4 in FIG. 5).

In the replay mode, the processor 104 controls the photographed image to be displayed on the LCD monitor 10 (Step S5 in FIG. 5). Next, whether or not the mode dial SW2 has been switched is determined by the processor 104 (Step S6 in FIG. 5). If the mode dial SW2 has been switched over to a different mode, the process moves to S1, while if the mode dial SW2 remains in the replay mode, the process repeats from S5.

Thus, the processor 104 and the F/E-IC 102 function as a computation device to process signals from the CCD 101. The computation device functions to drive the image-blur suppression mechanism when the image-blur suppression is performed, which will be described hereinafter.

4. Principal of the Image-blur Suppression

Figure 6A:
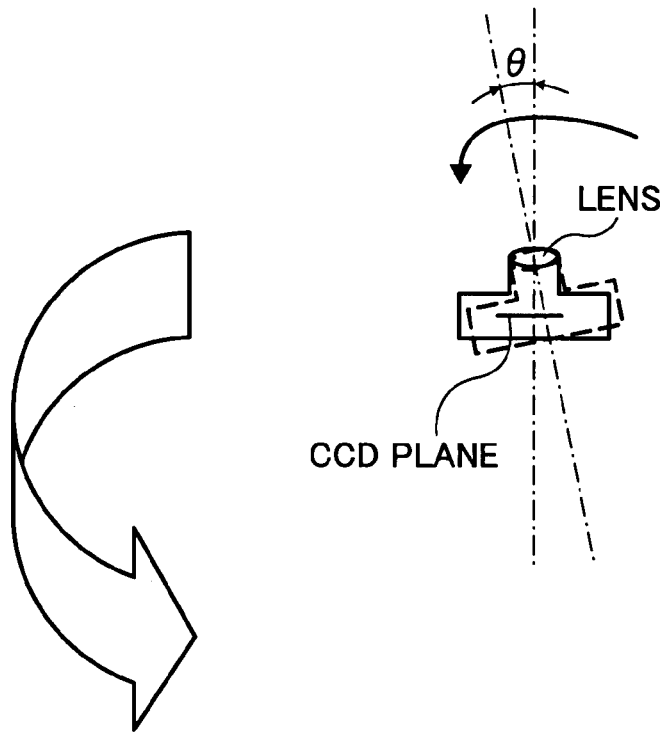
FIG. 6A shows an inclination of the digital camera and FIG. 6B is an enlarged partial view showing a relationship between a photographing plane of a CCD and a photographing lens of the digital camera according to the present invention.
Figure 6B:
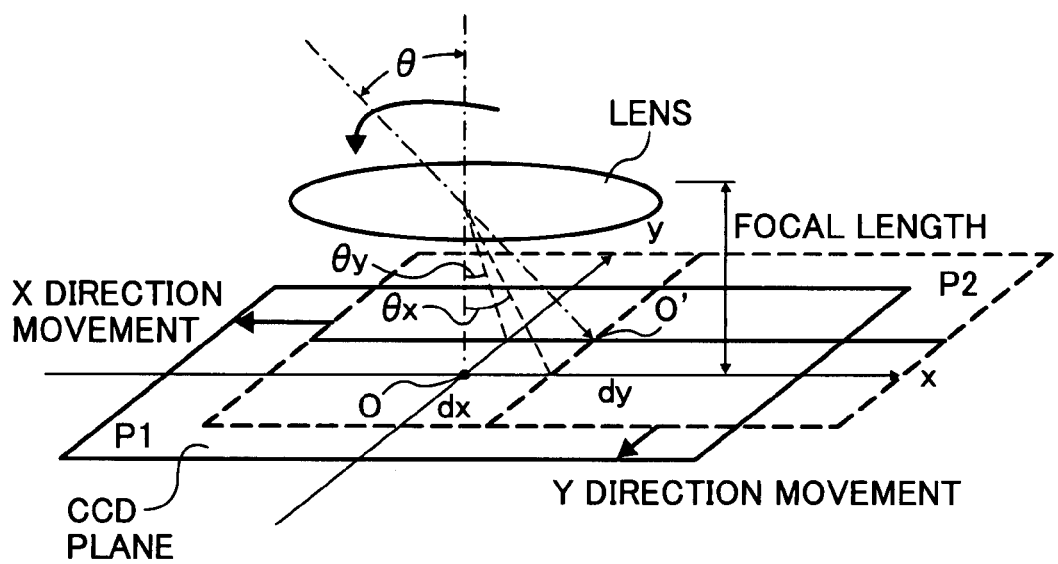

FIG. 6 shows a principal of the image-blur suppression. FIG. 6A shows a state of the digital camera without the camera shake depicted in solid lines and a state of the digital camera inclined by the camera shake depicted in dot lines. FIG. 6B is an enlarged partial view showing a relationship between a photographing plane of the CCD 101 and the photographing lens of the camera main body.

When there is no camera shake to the camera, the photographing plane of the CCD 101 is position at a position P1, in other words, a central position, and the subject image is projected at the zero point O. In the present embodiment, the camera is presumed to be inclined by the camera shake at an angle of θ (θx, θy). Accordingly, the photographing plane is moved to a position P2 and the subject image is projected at a position O'. Thus, the image-blur suppression mechanism functions to move the photographing plane in parallel a dx along X axial direction and a dy along Y axial direction such that the photographing plane are positioned at P1 and the subject image are projected again at the zero point O.

5. Mechanical Configuration of the Image-blur Suppression Mechanism

Figure 7:
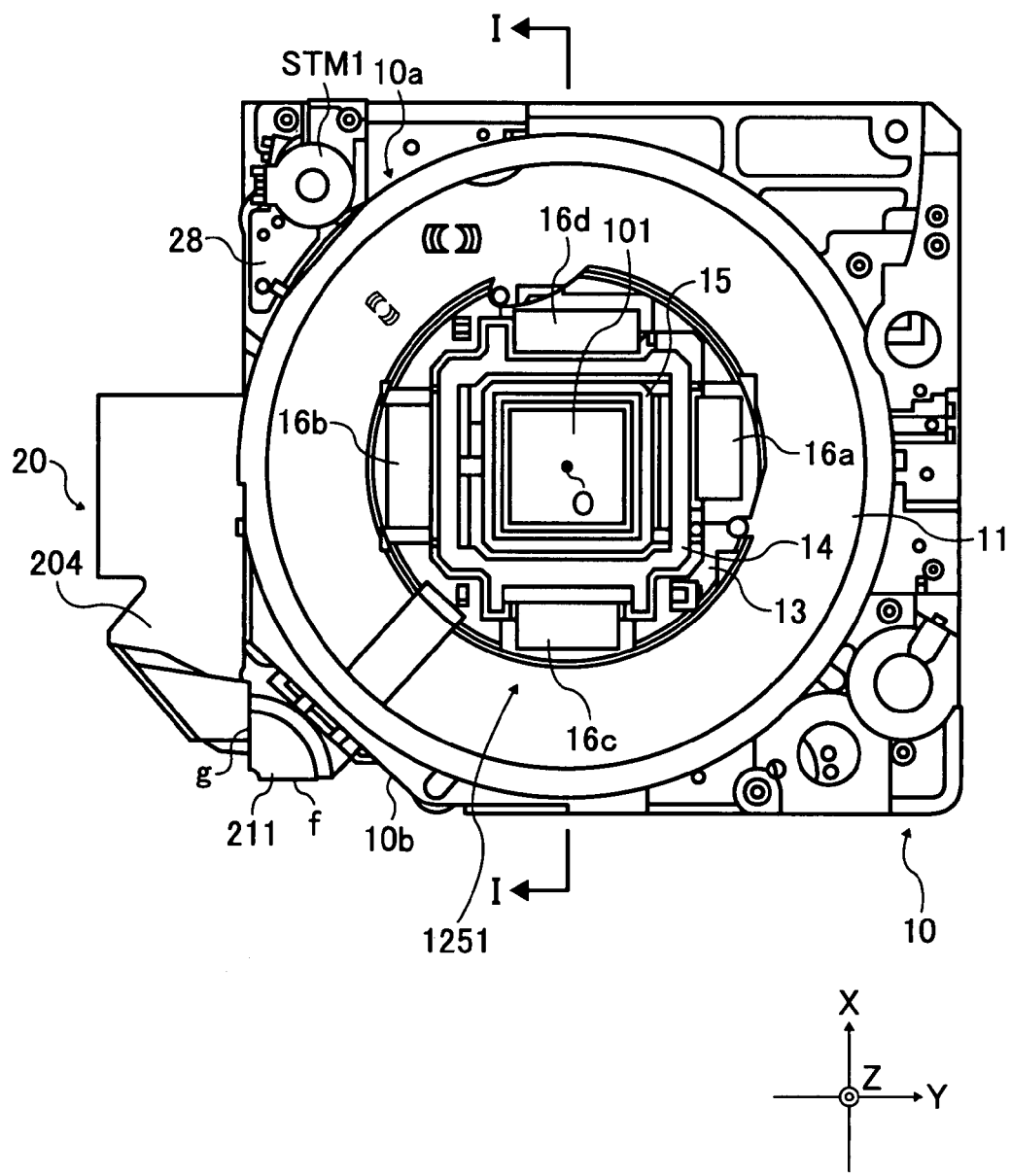
FIG. 7 is a front view showing a holding tube for housing a lens barrel of the digital camera according to the present invention.
Figure 8:
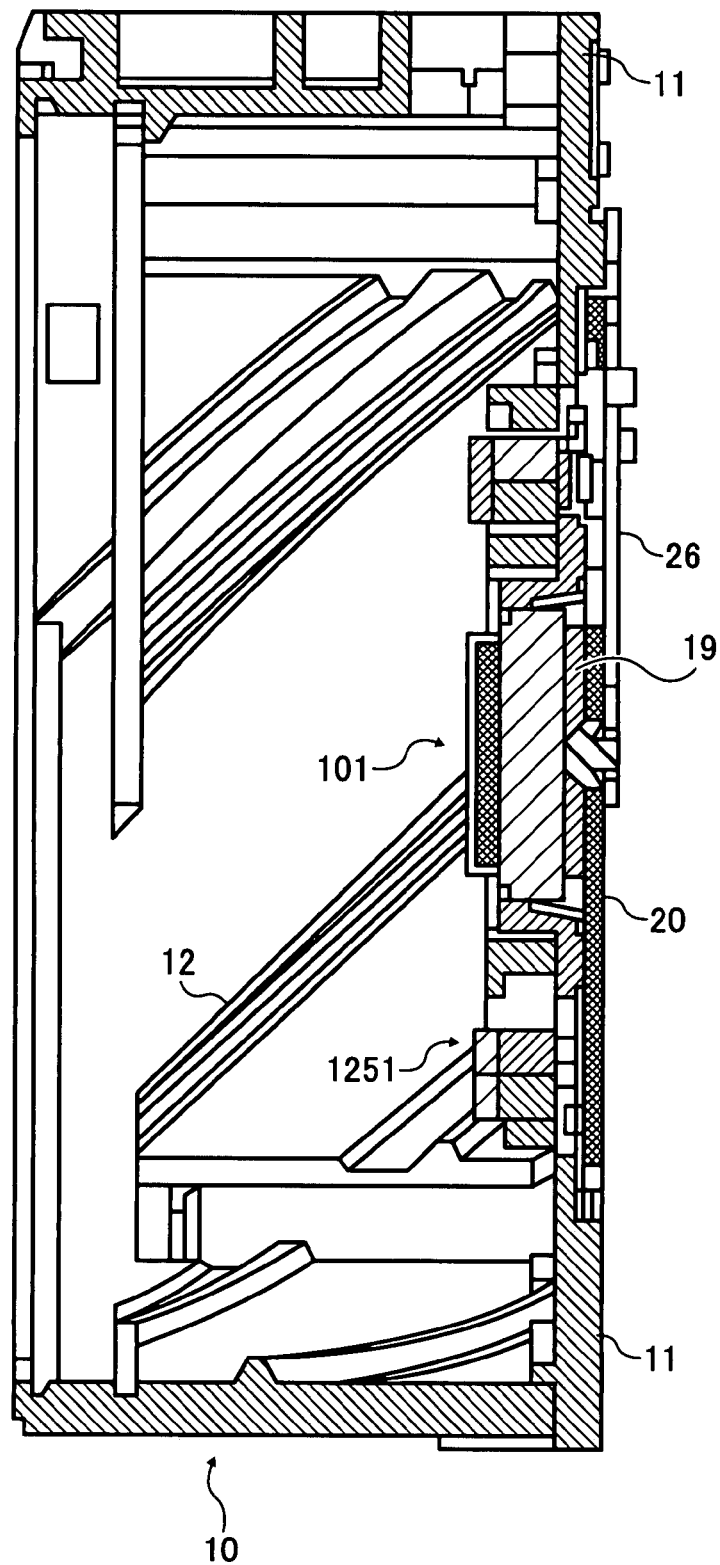
FIG. 8 is a vertical section view of the holding tube in FIG. 7.

In FIG. 7 to FIG. 9, numeral 10 represents the holding tube having a boxy shape, an inner part of which is a space for holding the lens barrel therein. The holding tube 10 is disposed in the main body at a defined position in relation to a photographing optical axis. A rear surface of the holding tube 10 is attached with a base member 11 which is a plate of a roughly rectangular shape in whole. A helicoid 12 is formed at an inner peripheral wall of the holding tube for extending or collapsing the lens barrel. The holding tube 10 has at least two corners cutout to form one corner portion 10a as an attaching portion for the stepping motor STM1 and the other corner portion 10b as a folding space for a flexible base plate 20 which will be described hereinafter.

Figure 10:
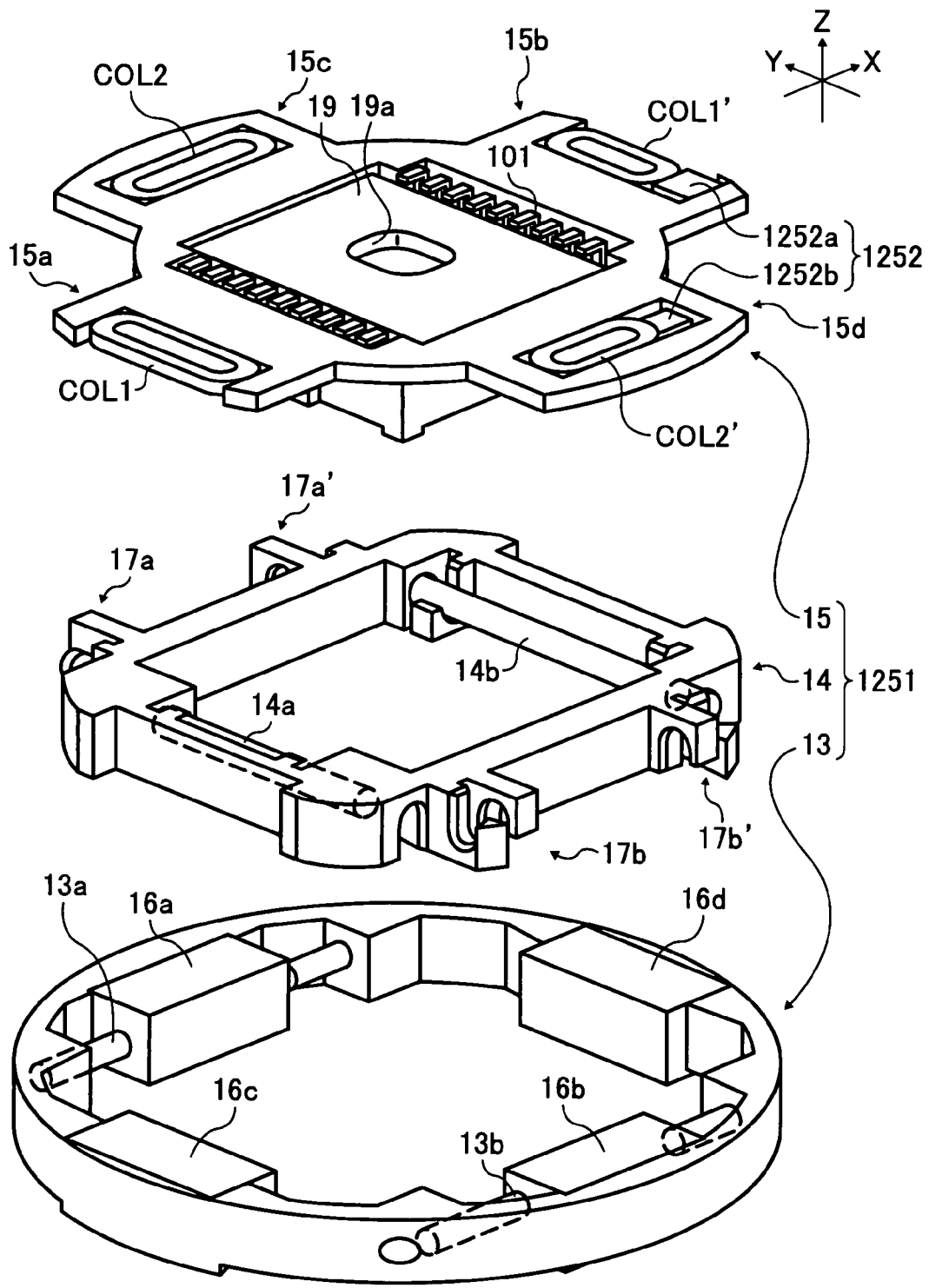
FIG. 10 is an exploded perspective view of a CCD stage of the digital camera according to the present invention.

The CCD stage 1251 is provided at the base member 11. The CCD stage 1251 includes substantially an X direction stage 13 of an annular frame shape, a Y direction stage 14 of a rectangular shape and a mount stage 15, as shown in the exploded view in FIG. 10.

The X direction stage 13 is fixed at the base member 11. In the X direction stage 13, there are provided a pair of guide shafts 13a and 13b extending along X axial direction, and four permanent magnets 16a to 16d of a cubic shape. The guide shafts 13a and 13b are disposed with a separation distance along Y axial direction. The four permanent magnets 16a to 16d are provided in the XY plane in pair with one pair of the permanent magnets 16a and 16b disposed in parallel with each other with a separation distance along Y axial direction and the other pair of the permanent magnets 16c and 16d disposed in parallel with each other with a separation distance along X axial direction.

In the present embodiment, the pair of the guide shafts 13a and 13b are configured to pass through the pair of the permanent magnets 16a and 16b but not limited to the configuration; it is also preferable to dispose the pair of the permanent magnets 16a and 16b in parallel with the pair of the guide shafts 13a and 13b.

In the Y direction stage 14, there are provided a pair of guide shafts 14a and 14b extending along Y axial direction, two pairs of groove portions 17a and 17a', 17b and 17b'. The guide shafts 14a and 14b are disposed with a separation distance along Y axial direction. The two pairs of groove portions 17a and 17a', 17b and 17b' which are formed with a separation distance along Y axial direction opposing to each other along X axial direction with a separation distance are supported by the pair of guide shafts 13a and 13b respectively. As a result, the Y direction stage 14 is movable along X axial direction.

The mount stage 15 includes a pair of coil attaching plates 15a and 15b extending out to X axial direction and a pair of coil attaching plates 15c and 15d extending out to Y axial direction. The CCD 101 is fixed at the center of the mount stage 15. In the mount stage 15, there are also provided at the same side with the photographing plane of the CCD 101 with two pairs of groove portions (numerals omitted) which are formed with a separation distance along X axial direction opposing to each other along Y axial direction with a separation distance are supported by the pair of guide shafts 14a and 14b respectively. As a result, the mount stage 15 is movable along X and Y axial directions in whole.

A protection plate 19 is attached on a surface opposing to the photographing plane of the CCD 101. A recess portion 19a of a tapered shape is formed in the center of the protection plate 19, whose functions will be described hereinafter.

Coiled bodies COL 1 and COL1' which are flat and convoluted are attached on the pair of coil attaching plates 15a and 15b, respectively. The coiled bodies COL 1 and COL1' are connected in series. Similarly, coiled bodies COL 2 and COL2' which are flat and convoluted are attached on the pair of coil attaching plates 15c and 15d, respectively. The coiled bodies COL 2 and COL2' are also connected in series.

The coiled bodies COL 1 and COL1' are confronted by the permanent magnets 16c and 16d, respectively and the coiled bodies COL 2 and COL2' are confronted by the permanent magnets 16a and 16b, respectively. The pair of coiled bodies COL 1 and COL1', the pair of COL 2 and COL2' function to move the CCD 101 along X axial direction and Y axial direction, respectively.

As shown in FIG. 9, an adsorption bar 35 is disposed in the respective of the coiled bodies COL 1 and COL1' so as to intersect the respective of the coiled bodies COL 1 and COL1' along X axial direction.

In the present embodiment, a hall element is used in the position detecting element 1252. At one of the coil attaching plates 15a and 15b, for example, the coil attaching plate 15b is provided with a hall element 1252a. Similarly, a hall element 1252b is provided at one of the coil attaching plates 15c and 15d, for example, the coil attaching plate 15d.

Figure 11:
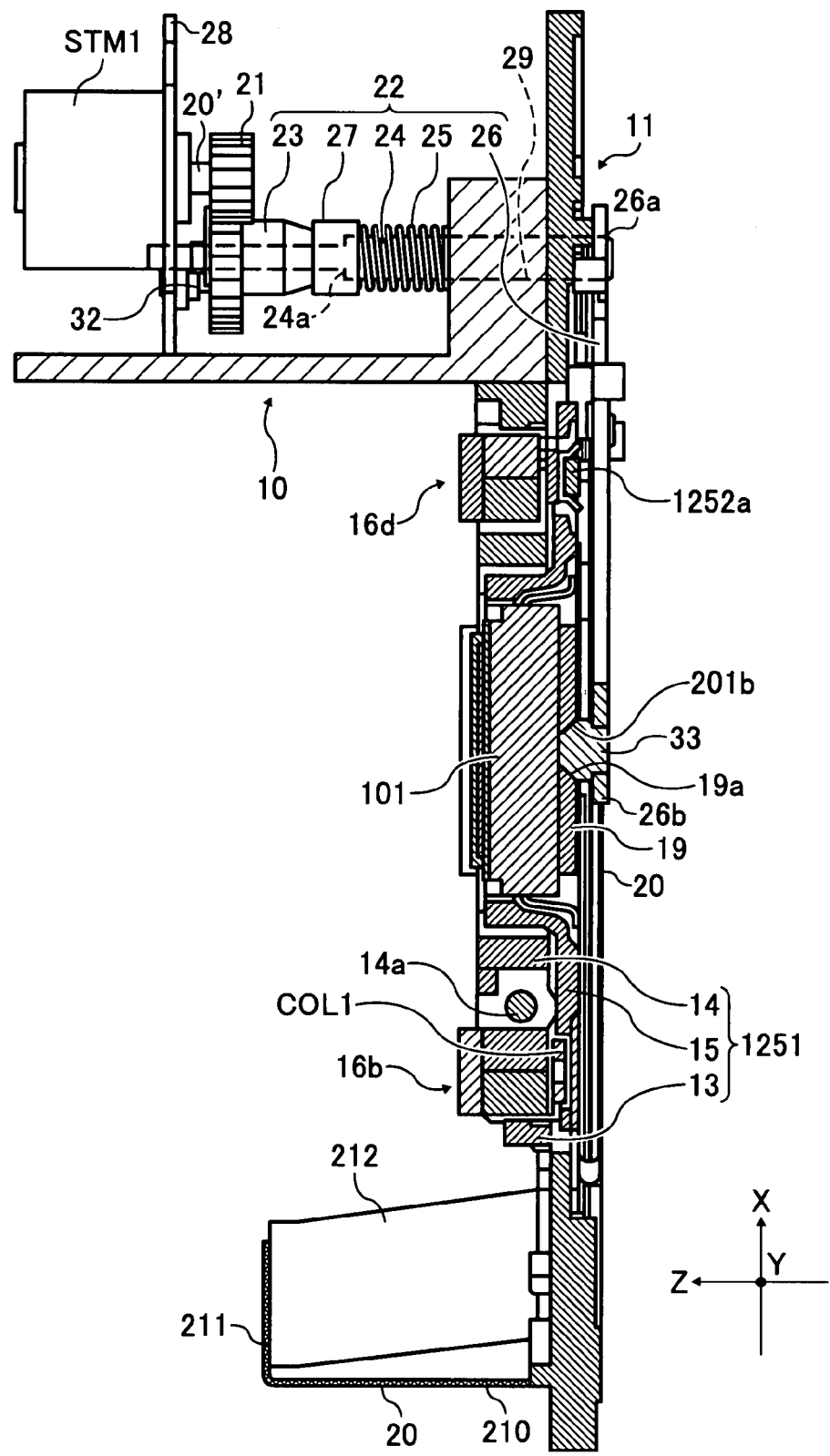
FIG. 11 is an enlarged partial section view of the holding tube in FIG. 9B sectioned along an II-II line.

The CCD 101 is connected to the F/E IC 102 electrically via the flexible base plate 20 as shown in FIG. 11. The hall elements 1252a and 1252b are connected electrically to the amplifier 1253 which is an operational amplifier via the flexible base plate 20 and each of the coiled bodies COL1, COL1', COL 2 and COL2' is connected electrically to the driver 1254 which is a coil driver.

Figure 12A:
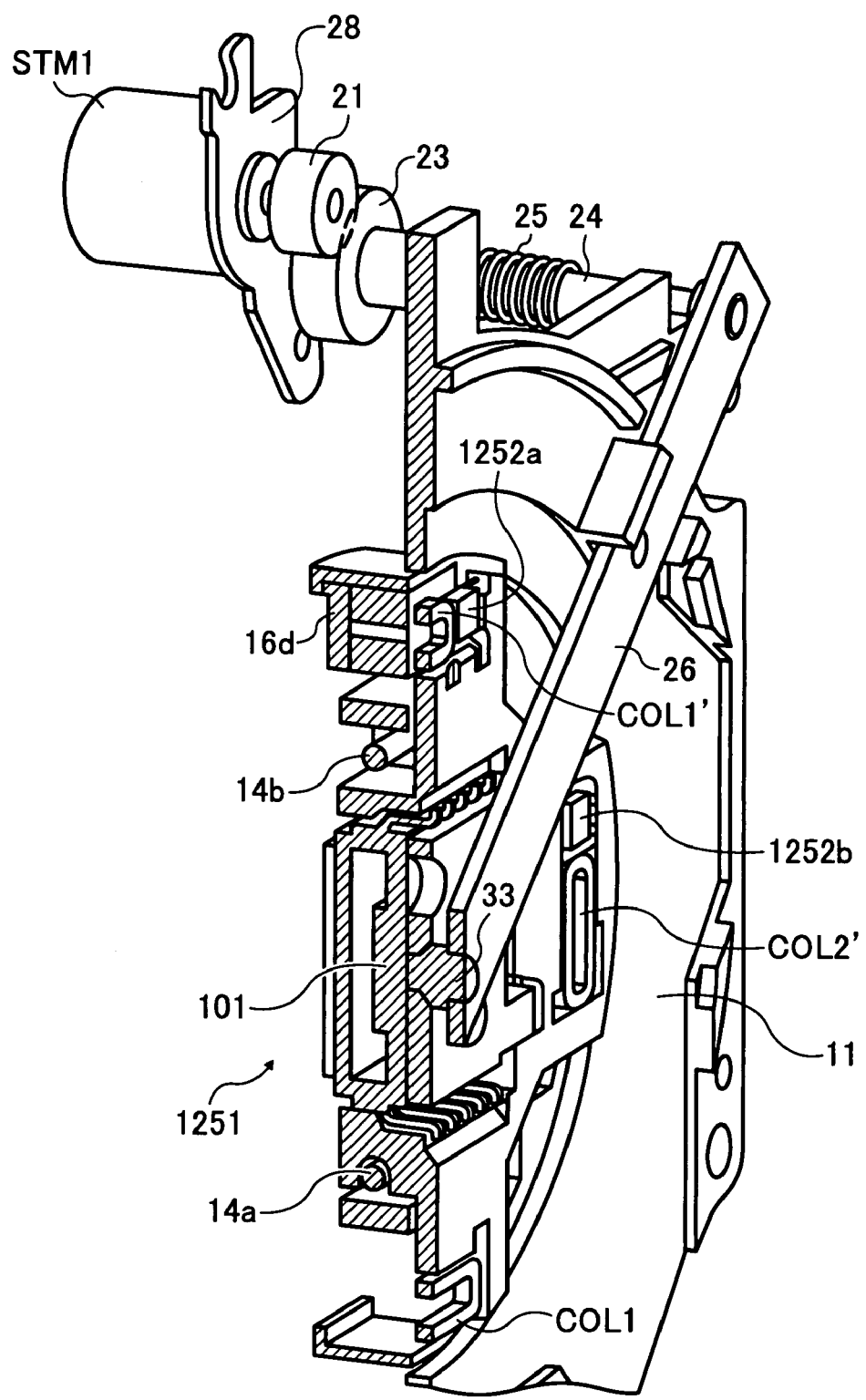
FIG. 12A is a perspective view showing a connection relationship among the CCD stage, a stepping motor and a conversion mechanism
Figure 12B:
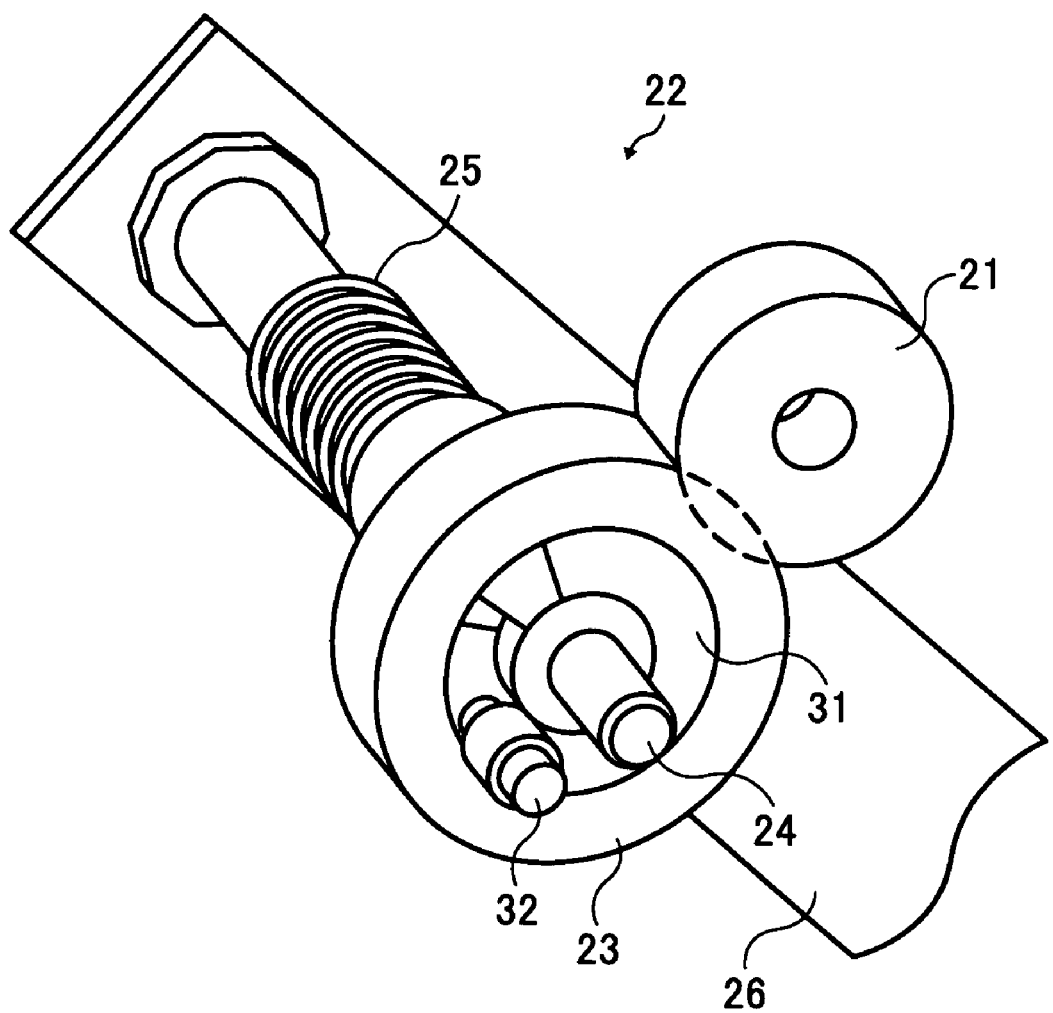
FIG. 12B is an enlarged partial view of the conversion mechanism.

As shown at an enlarged view in FIG. 11 and FIG. 12, the zero point retention mechanism 1263 includes the stepping motor STM1, whose mechanical configuration will be described in detail at first, leaving descriptions on driving and controlling of the stepping motor STM1 hereinafter.

As shown in FIG. 7 and FIG. 11, the stepping motor STM1 is disposed at the corner portion 10*a* of the holding tube 10. An output shaft 20' of the stepping motor STM1 is provided with an output gear 21. The corner portion 10*a* is provided with a conversion mechanism 22 which converts a rotational movement to a linear movement.

The conversion mechanism 22 includes a rotation transferring gear 23, a spring bearing member 27, a reciprocating shaft 24, a coil biasing spring 25 and a spring retention plate 26. The corner portion 10*a* of the holding tube 10 is provided with a pair of supporting portions 28 and 29 with a separation distance along Z axial direction. In the present embodiment, the supporting portion 28 is configured as a motor attaching plate. The reciprocating shaft 24 is supported by crossing the motor attaching plate 29 and the supporting portion 29. The rotation transferring gear 23 is disposed to be rotationally supported by the reciprocating shaft 24 and meshed with the output gear 21 between the pair of supporting portions 28 and 29.

One end portion of the reciprocating shaft 24 penetrates the supporting portion 29, confronting a back surface of the base member 11. The coil biasing spring 25 is provided between the spring bearing member 27 and the supporting portion 29 to bias the reciprocating shaft 24 toward the supporting portion 28. The reciprocating shaft 24 includes a ramp portion 24*a* engaging with a shaft hole at an end portion of the rotation transferring gear 23.

As shown in FIGS. 13A to 13E, there is formed a cam groove 31 at the end portion of the rotation transferring gear 23, extending around the rotation transferring gear 23. The cam groove 31 includes a flat valley floor 31*a*, a flat peak 31*b*, an inclination surface 31*c* inclining continuously from the flat valley floor 31 up to the flat peak 31*b* and a sharp wall 31*d* formed between the flat valley floor 31 and the flat peak 31*b* as a contacting wall for a cam pin 32 to be described hereinafter.

There is fixed at the supporting portion 28 the cam pin 32, a top end of which contacts the cam groove 31 in such a way that it is sidable along the cam groove 31. A rotation length of the flat valley floor 31*a* from the sharp wall 31*d* to an inclination starting point 31*e* of the inclination surface 31*c* is configured to be equivalent to 2 pulses of a rotation control signal of the stepping motor STM1.

A rotation length of the inclination surface 31*c* from the inclination starting point 31*e* of the inclination surface 31*c* passing through the flat peak 31*b* to an inclination ending point 31*f* of the inclination surface 31*c* is configured to be equivalent to 30 pulses of the rotation control signal of the stepping motor STM1.

A rotation length of the flat peak 31*b* from the inclination ending point 31*f* to the sharp wall 31*d* is configured to be equivalent to 3 pulses of the rotation control signal of the stepping motor STM1. The 35 pulses of the rotation control signal of the stepping motor STM1 correspond to one rotation round of the rotation transferring gear 23 which makes the reciprocating shaft 24 complete one reciprocation along Z axial direction.

As shown in FIG. 9, the back surface of the base member 11 is provided with the spring retention plate 26 elongated toward the center of the CCD 101 which is configured to have a rear end portion 26*a* fixed at one end of the reciprocating shaft 24, a free end portion 26*b* fixed by a taper-shaped retention pin 33, and a protruding guide axis 26*c* formed therebetween.

Position determining projections 11*a* and 11*b*, a coil attaching projection 11*c* and an engaging projection 11*d* are formed at the base member 11. A recoiled portion 34*a* of a torsion spring 34 is attached to the coil attaching projection 11*c*, while one end portion 34*b* of the torsion spring 34 is engaged with the engaging projection 11*d* and the other end portion 34*c* of the torsion spring 34 is engaged with the guide axis 26*c*. A guide hole (not shown) to guide the guide axis 26*c* is formed at the base member 11.

While retaining a contact with the position determining projection 11*a*, the spring retention plate 26 is made reciprocated by the torsion spring 34 for leaving from or approaching to the base member 11 along Z axial direction in accordance with the reciprocation of the reciprocating shaft 24. The guide axis 26*c* functions to stabilize the reciprocating movement of the spring retention plate 26.

Figure 14A:
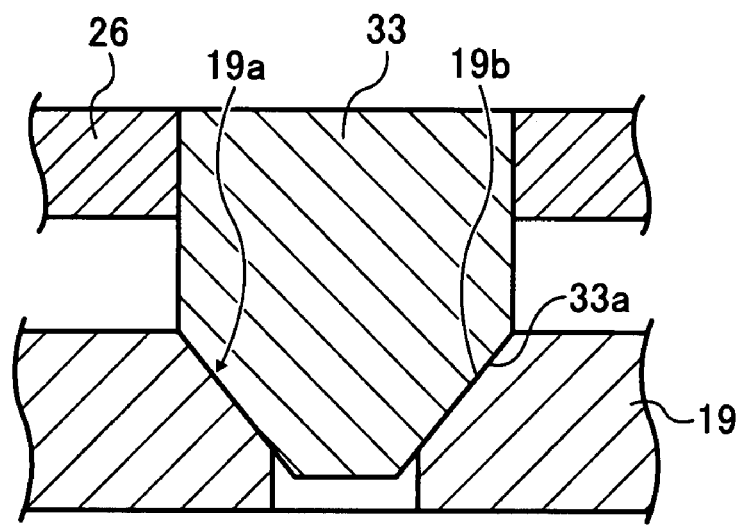
FIG. 14A is an enlarged partial section view showing a close fitted state between the holding pin and the recess portion and FIG. 14B is an enlarged partial section view showing a separating state between the holding pin and the recess portion.
Figure 14B:
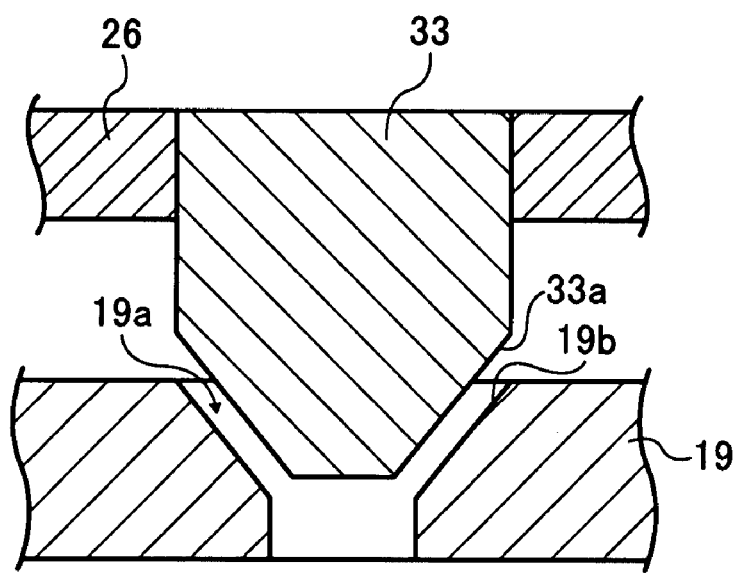

The retention pin 33 fulfills its function to retain mechanically the mount stage 15 at the zero point position by fitting itself to the recess portion 19*a*. As shown in an enlarged view in FIG. 14A, a state in which a peripheral wall 33*a* of the retention pin 33 is closely fitted to the recess portion 19*a* of the protection plate 19 corresponds to a holding standby position of the cam pin 32 which is also the zero point position of the mount stage 15. While another state in which the peripheral wall 33*a* of the retention pin 33 is separated in the max distance to the recess portion 19*a* of the protection plate 19 corresponds to a releasing standby position of the cam pin 32 as shown in an enlarged view in FIG. 14B.

6. Folding of the Flexible Base Plate

The flexible base plate 20 (Hereinafter referred to as a print base plate) includes a CCD connection section 201, a coil connection section 202, a position detecting element connection section 203, a block circuit connection section 204 and a connection extension section 205.

Figure 15:
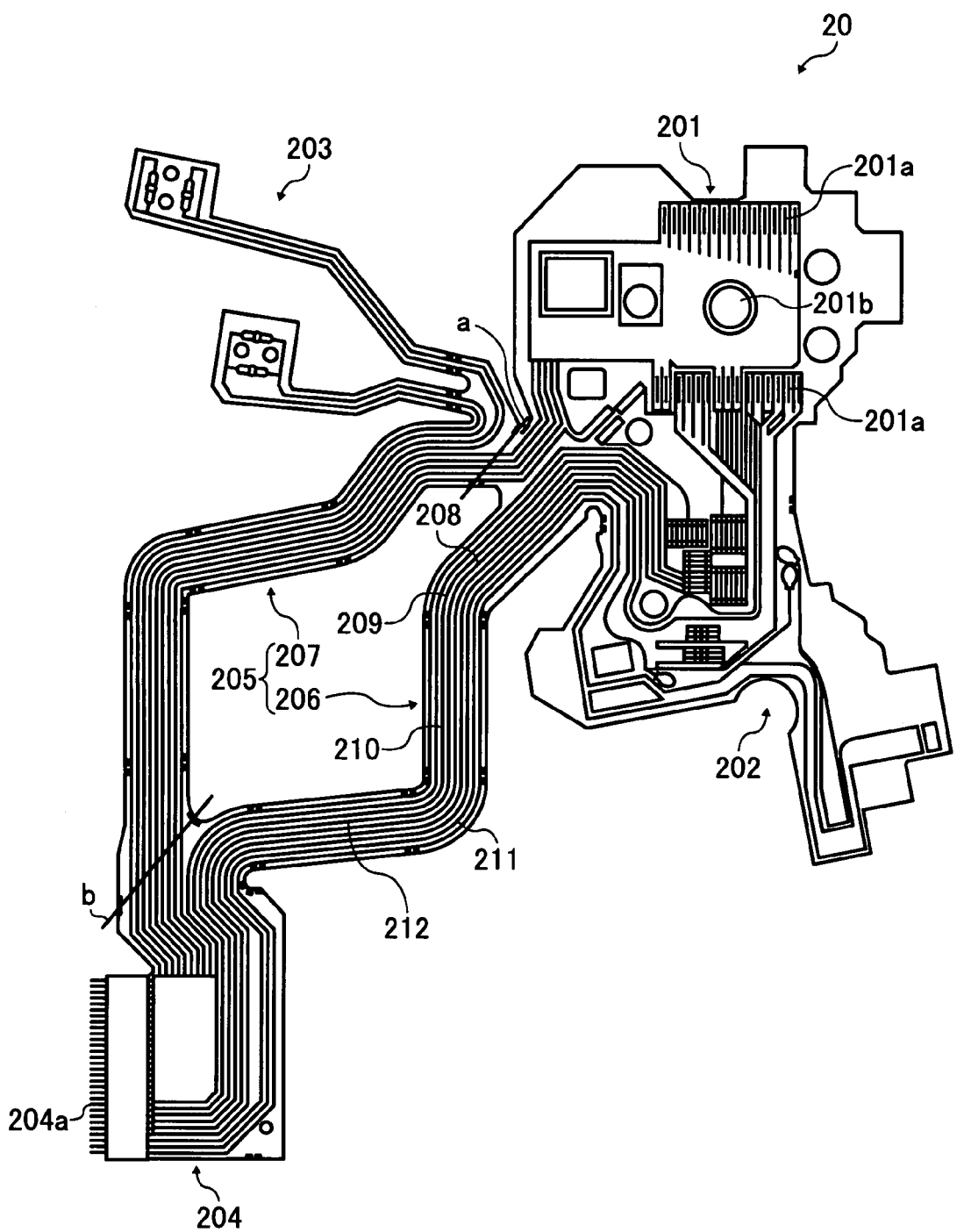
FIG. 15 is a view of the flexible base plate before superimposed.

As shown in FIG. 15, the CCD connection section 201 includes a connection pattern portion 201*a* corresponding to connection pins of the CCD 101 and a penetrated hole 201*b* corresponding to the recess portion 19*a* of the protection plate 19.

The coil connection section 202 is provided with a connection pattern portion for electrically connecting to each coil body of COL1, COL1', COL2 and COL2' (which are not shown in FIGS. and hereinafter referred to as each coil body COL); and the position detecting element connection section 203 is also provided with a connection pattern portion for electrically connecting to the position detecting element 1252. Thus, in the present embodiment, one end of the CCD connection section 201 which is connected by the photographing element CCD 101 functions as a photographing element connection section.

The block circuit connection section 204 includes a connection pattern portion 204*a* for electrically connecting to the F/E IC 102, the operational amplifier 1253 and the coil driver 1254. As a result, a system block circuit may connect to the CCD connection section 201, the coil connection section 202 and the position detecting element connection section 203 electrically via the connection extension section 205. Thus, in the present embodiment, the other end of the block connection section 204 which is connected to the computation device, that is, the processor 104 and the F/E IC 102, functions as an computation connection section.

In the present embodiment, the connection extension section 205 is configured to branch into a first connection extension portion 206 and a second connection extension portion 207, both of which may overlap with each other if either of them is folded along a linear line a and another linear line b. The second connection extension portion 207 has a same configuration as that of the first connection extension portion 206 if two surfaces of the second connection extension portion 207 are reversed, thus, a description concerning the configuration of the second connection extension portion 207 will be omitted.

Figure 16:
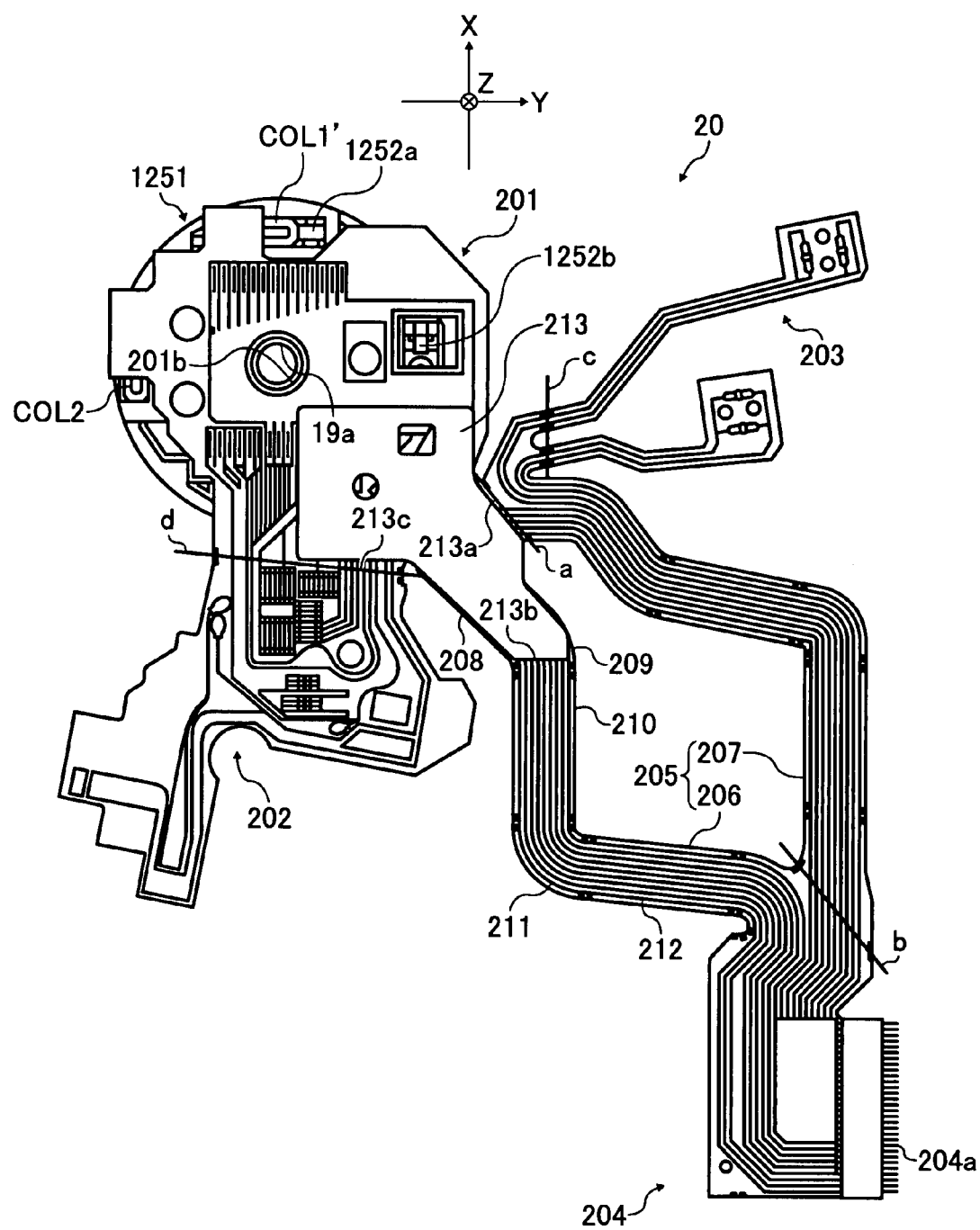
FIG. 16 is a view showing a connection state of the flexible base plate before superimposed to the CCD stage.

As shown in FIG. 16, the first connection extension portion 206 includes a first linear part 208, a first curving part 209, a second linear part 210, a second curving part 211 and a third linear part 212 with a same width.

When disposed, the first linear part 208 extends from the CCD connection section 201 disposed on the rear surface of the CCD 101 in a direction of an inclined angle of 45 degrees with respect to X and Y axes toward the corner portion 10b. The first curving part 209 has in general a circular sector shape with a central angle of roughly 45 degrees and connects the first linear part 208 and the second linear part 210 therebetween. The second linear part 210 extends along X axial direction. The second curving part 211 has in general a circular sector shape with a central angle of roughly 90 degrees and connects the second linear part 210 and the third linear part 212 therebetween. The third linear part 212 is configured to have a length equal to that of the second linear part 210 and extend along a direction perpendicular to the second linear part 210, in other words, along Y axial direction.

7. Fixation of the Flexible Base Plate

As shown in FIG. 16, the print base plate 20 is fixed at the CCD stage 1251 from the protection plate 19 side by matching the connection pattern portion 201a of the CCD connection section 201 with the connection pins of the CCD 101 and the penetrated hole 201b with the recess portion 19a, respectively.

A FPC auxiliary plate 213 is fixed at the print base plate 20. The FPC auxiliary plate 213 is configured to match in shape with a part of the CCD connection section 201, the first linear part 208 and the first curving part 209 of the first connection extension portion 206, and to include a first edge portion 213a along the linear line a, a second edge portion 213b along a boundary line of the first curving part 209 and the second linear part 210, and a third edge portion 213c along a linear line d.

Figure 17:
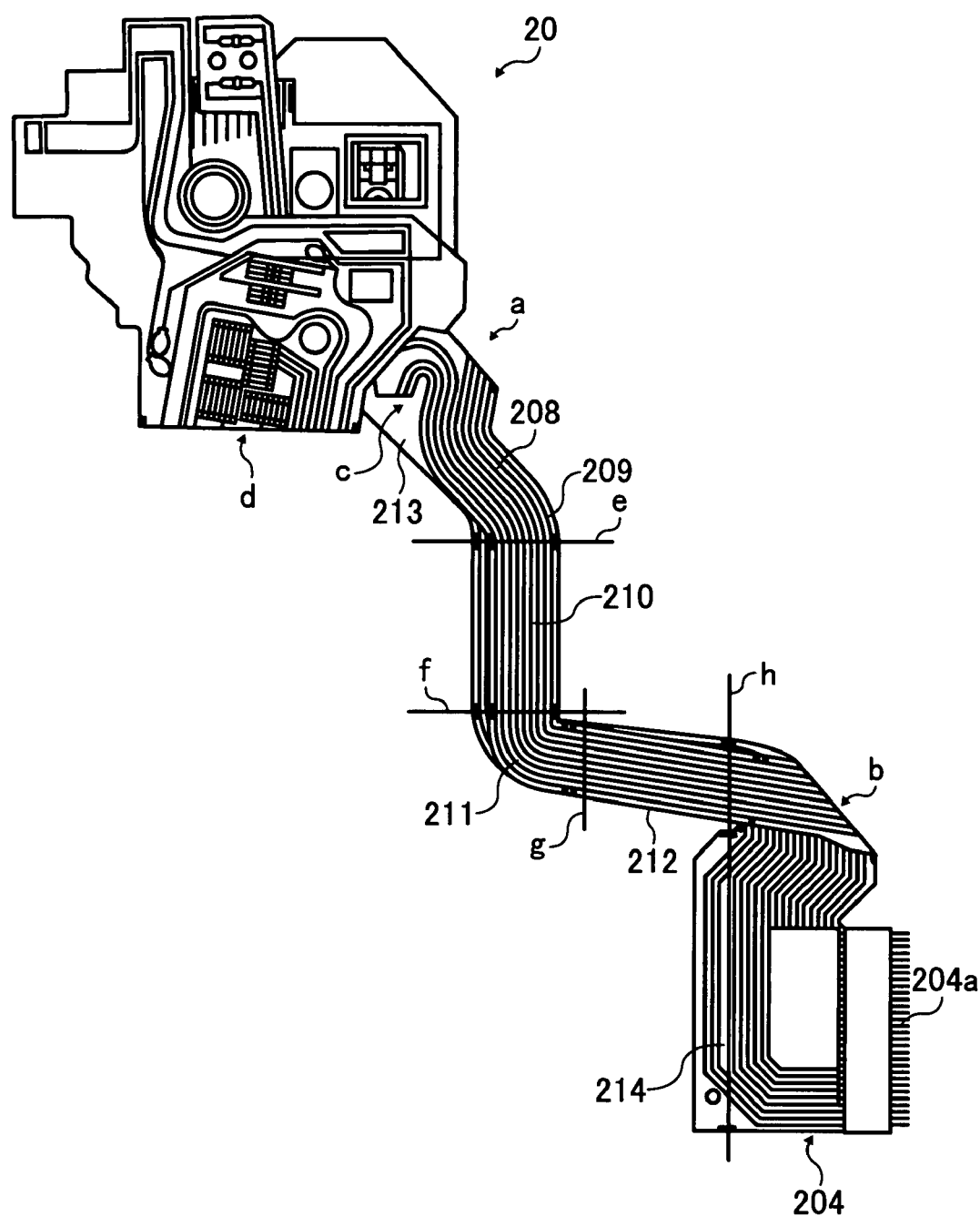
FIG. 17 is a view showing a superimposed stage of a connection extension section of the flexible base plate.
Figure 18A:
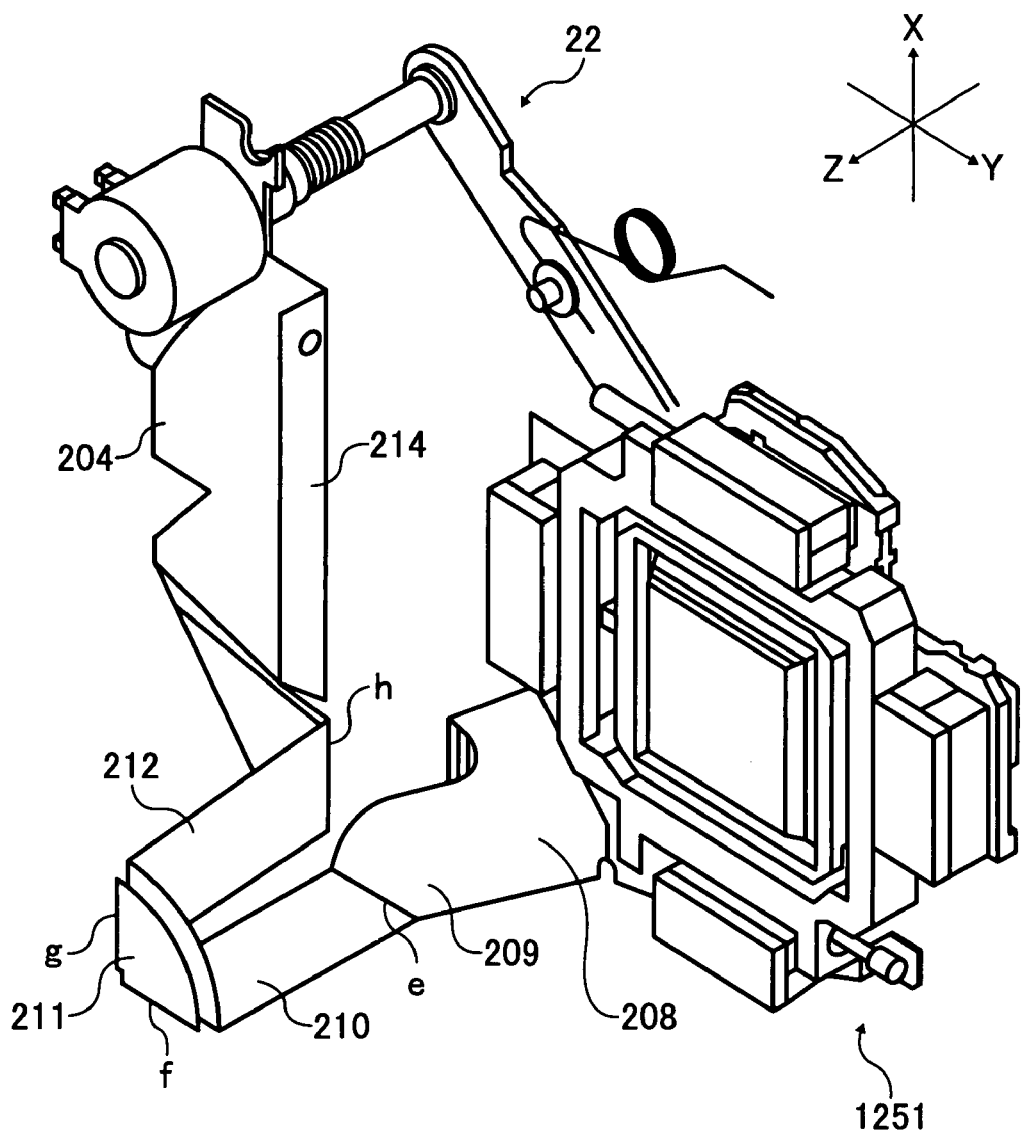
FIG. 18A, FIG. 18B and FIG. 18C are views viewing from different angles.
Figure 18B:
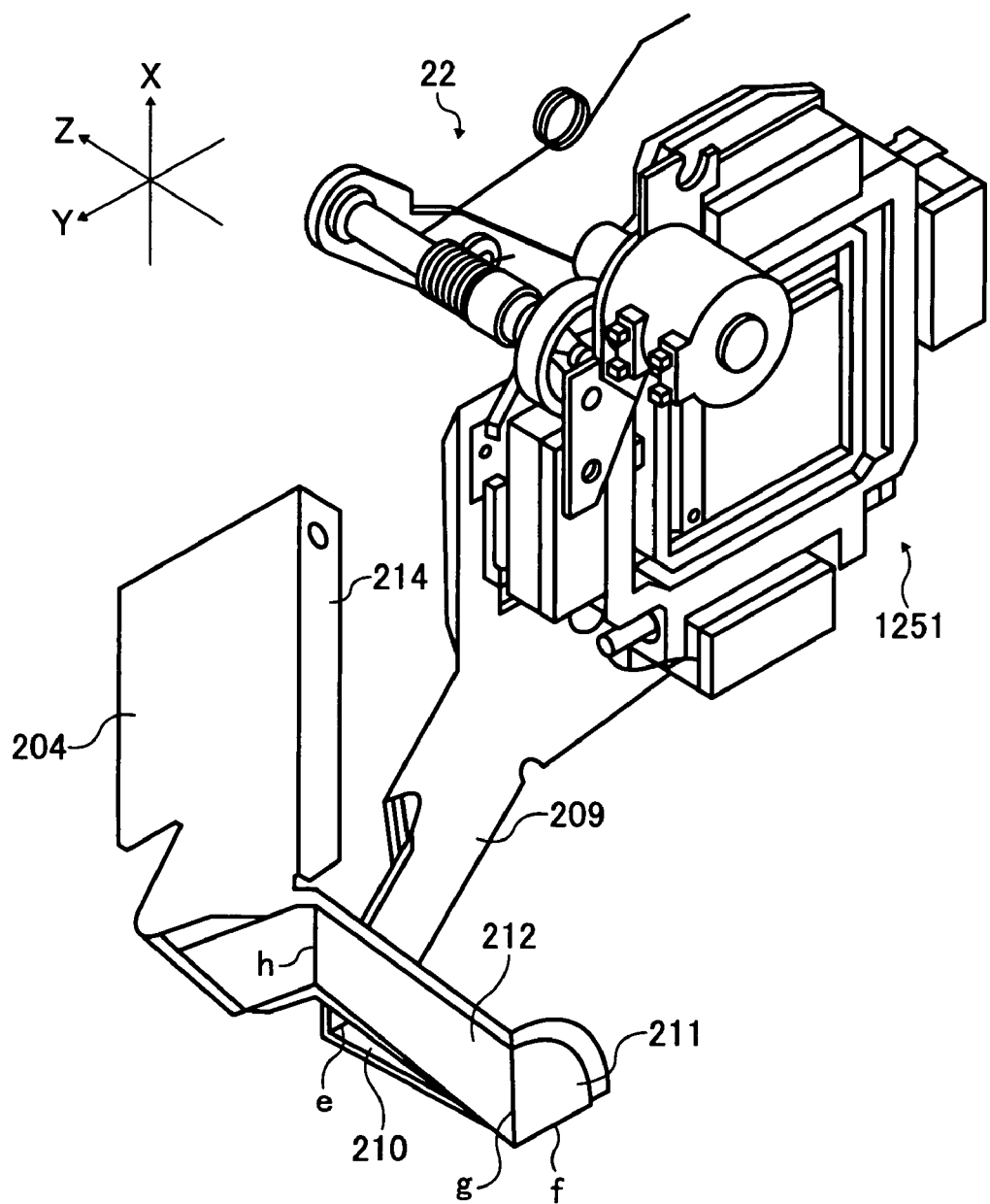
Figure 18C:
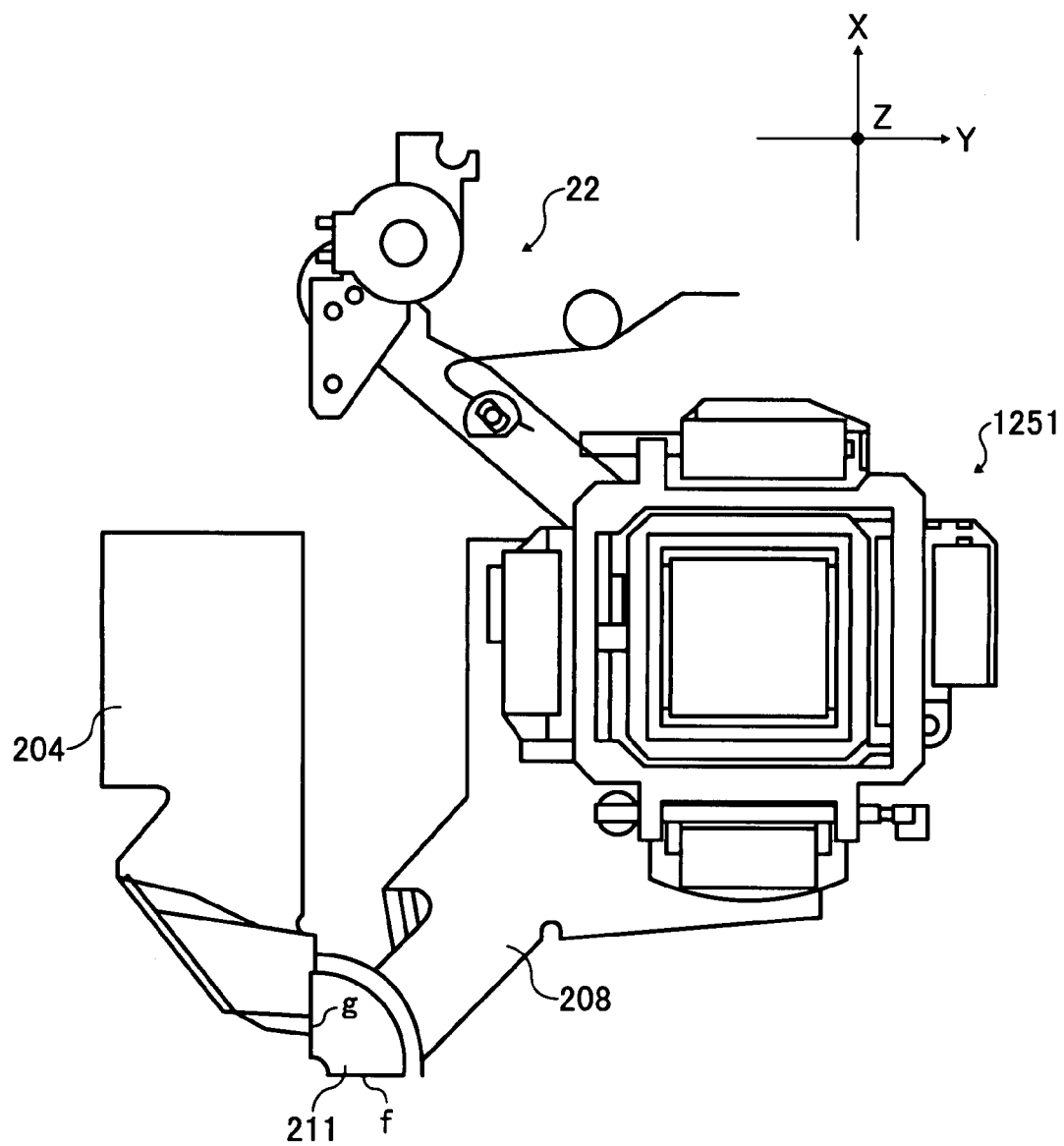

As shown in FIG. 17, the second connection extension portion 207 is folded and overlapped over the first connection extension portion 206 so as to sandwich the FPC auxiliary plate 213 therebetween, using the linear line a and the linear line b as folding lines.

Using a linear line c as a folding line, the position detecting element connection section 203 is folded and overlapped over the CCD connection section 201, and connected to the position detecting element 1252 electrically.

Using the linear line d as a folding line, the coil connection section 202 is folded and overlapped over the CCD connection section 201, and connected to the each coil body COL electrically. According to this procedure, the print base plate 20 is fixed at the CCD stage 1251 and positioned at the XY plane on the base member 11, as shown in FIG. 17.

As shown in FIG. 9B, FIG. 11, FIG. 18A and FIG. 18B, the second linear part 210 is folded close to a right angle through plastic deformation along a linear line e at the corner portion 10b of the holding tube 10 so as to extend along an YZ plane.

Furthermore, the second curving part 211 is folded close to a right angle through plastic deformation along a linear line f so that the second curving part 211 extends along the holding tube 10 other than the second linear part 210 in an XY plane displaced from the base member 11 to the lens barrel side along Z axial direction.

The third linear part 212 is folded close to a right angle through plastic deformation along a linear line g at the corner portion 10b of the holding tube 10 so as to extend along an XZ plane.

The block connection section 204 is folded close to a right angle through plastic deformation along a linear line h so as to extend along an XY plane outside the holding tube 10. Through a back-folding portion 214 extending along the XZ plane which is formed by folding along the linear line h, the block circuit connection section 204 is fixed at the base member 11 (Referring to FIG. 7 and FIG. 9B). Thus, the block circuit connection section 204 is fixed in the main body relative to the photographing optical axis.

Thus, the first linear part 208 and the first curving part 209 constitute a first extension section extending along the XY plane; the second linear part 210 constitutes a second extension section extending toward the subject viewing from the photographing element CCD 101; the second curving part 211 constitutes a third extension section extending along the XY plane; and the third linear part 212 constitutes a fourth extension section extending in a direction away from the subject viewing from the photographing element CCD 101.

When the image-blur suppression is performed, the mount stage 15 is moved along the XY plane on the base member 11. As a result, there rises on the print base plate 20 a variation on a relative distance between the mount stage connection side fixed to the mount stage 15 and the block circuit connection side fixed to the base member 11. In order to prevent a deformation force resulted from the variation on the relative distance therebetween, the print base plate 20 is configured to have the second linear part 210 in the YZ plane, the third linear part 212 in the XZ plane, both of which are positioned perpendicular to each other.

Since the print base plate 20 deforms easily along its thickness direction, a deformation force resulted from the bending deformation of the second linear part 210 along X axial direction and a deformation force resulted from the bending deformation of the third linear part 212 along Y axial direction may be absorbed, as a result, the deformation force resulted from the variation on the relative distance in the XY plane may be absorbed.

Furthermore, when a deformation force which is resulted from a movement of the mount stage 15 is applied to the folding portion, that is the linear line e, between the mount stage connection side and the second linear part 210, it becomes a distortional stress to make the second linear part 210 deforming to bend into a shape like a letter C toward one direction. Since the second curving part 211 is configured to be present in a XY plane enclosed by the second linear part 210, the third linear part 212 and the holding tube 10, thus the distortional stress may be alleviated to reduce its repulsive force, hence the deformation force resulted from the movement of the mount stage 15 may be effectively absorbed.

A same thing will happen to the third linear part 212 which absorbs a deformation force along Y axial direction.

As a result, the print base plate 20 will not hinder the mount stage 15 from moving along the XY plane when the image-blur suppression is performed.

Since the print base plate 20 is folded at the corner portion 10b of the holding tube 10 along Z axial direction, it is possible to utilize a peripheral space of the lens barrel which has a circular configuration in general, that is the corner portion 10b of the holding tube 10, and thus to prevent the camera from growing bigger in size.

Since the print base plate 20 is provided with the connection extension section 205 branched into the first connection extension portion 206 and the second connection extension portion 207 which may be folded and overlapped, it is possible to increase an electrical transmission path without increasing a width of the connection extension section 205 and it is also possible to hold the print base plate 20 in a limited space of the corner portion 10b of the holding tube 10. Therefore, it is not necessary to provide the second connection extension portion 207 if electrical transmission paths are limited.

Since the print base plate 20 is fixed with the FPC auxiliary plate 213, there will be no bending deformations occurred on the print base plate 20 from the CCD connection section 201 through the first linear part 208 up to the first curving part 209, and the deformation force resulted from the movement of the mount stage 15 may be transferred to act on the third linear part 212, therefore, it is certain for the deformation force to be absorbed effectively.

8. Zero Point Retention Control Circuit of the Image-blur Suppression Mechanism

Figure 19:
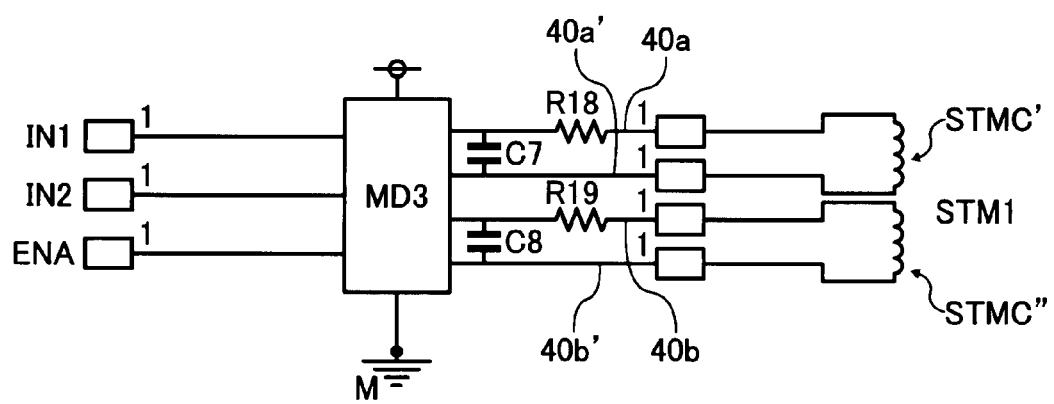
FIG. 19 is a circuit block view of the zero point retention mechanism according to the present invention.

The stepping motor STM1 is controlled by the zero point retention control circuit shown in FIG. 19 through a two-phase configuration. Each of terminals of a first coil STMC' is connected to a motor driver MD3 which is a part of the driver 1261 through output lines 40a and 40a', respectively. Each of terminals of a second coil STMC'' is connected to the motor driver MD3 through output lines 40b and 40b', respectively. Resistance R18 and R19 for limiting a currency are inter-positioned in the output lines 40a and 40b, respectively. A condenser C7 and a condenser C8 are inter-positioned between the output lines 40a and 40a', 40b and 40b', respectively.

The motor driver MD3 not only receives retention control signals ports IN1 and IN2 of the processor 104 but also receives enable signals from a port ENA of the processor 104, and based on the received signals, the motor driver MD3 performs a power control to the stepping motor STM1.

Figure 20:
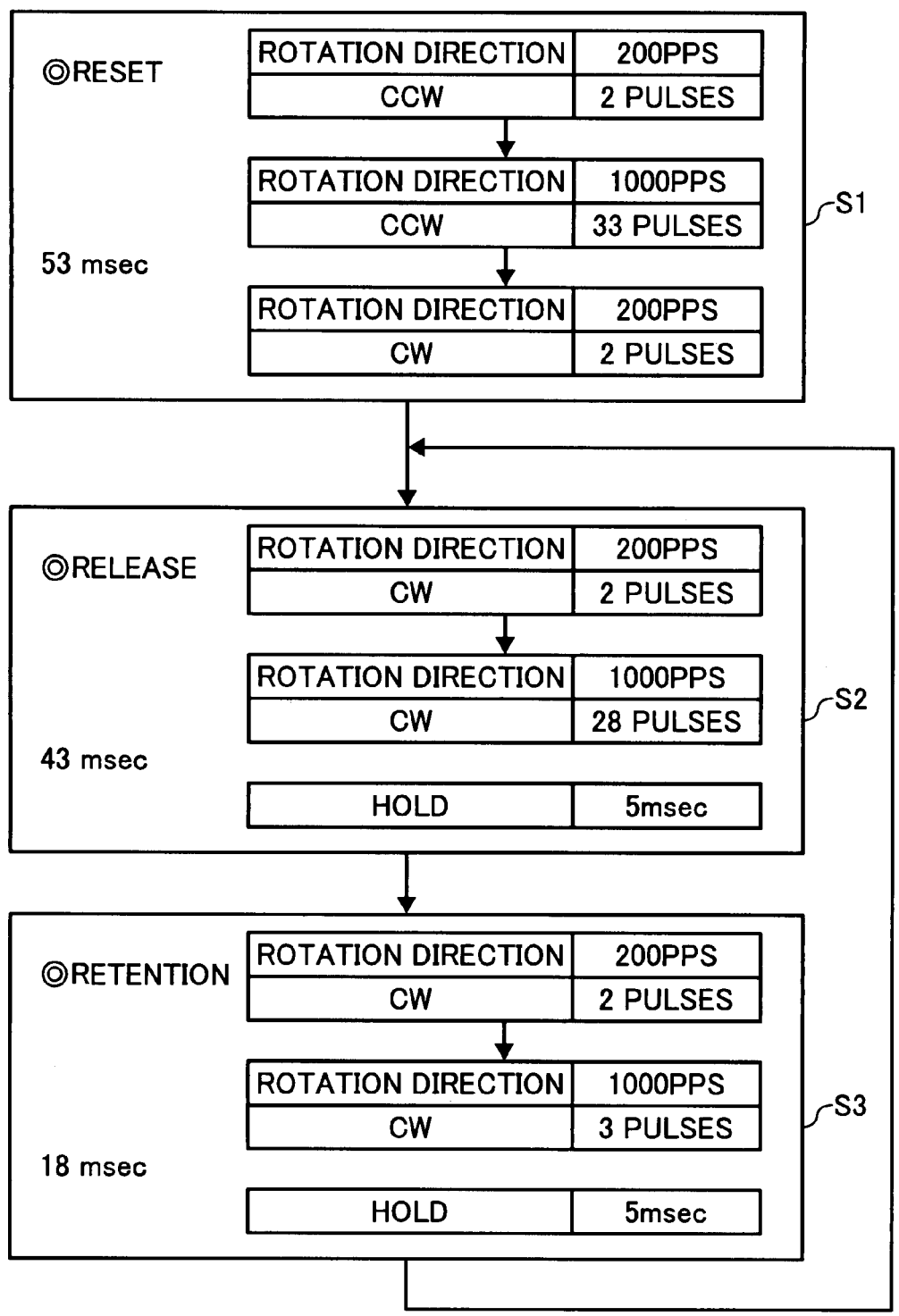
FIG. 20 is a flow chart showing an example of a control procedure of the zero point retention mechanism.

A flow chart is shown in FIG. 20 to explain an operation of the zero point retention control circuit including a three-step processing operation: a reset processing, a release processing and a retention processing.

In step S1, after the power switch SW13 of the digital camera is set on, the reset processing is performed at first controlled by the processor 104 to drive the stepping motor STM1 to rotate 2 pulses in a counter clockwise direction at a slow speed of 200 pps (pulse per second), then drive it to rotate 33 pulses in the counter clockwise direction at a fast speed of 1000 pps and finally drive it to rotate 2 pulses in a clockwise direction at a slow speed of 200 pps.

The cam pin 32 may contact physically the sharp wall 31d of the cam groove 31 if the stepping motor STM1 is rotated 35 pulses in the counter clockwise direction wherever the cam pin 32 is in the rotation direction of the cam groove 31.

After the stepping motor STM1 is rotated 2 pulses in the clockwise direction from the contact position, the cam pin 32 is set at the inclination starting position 31e of the cam groove 31 (Referring to FIG. 13E), which corresponds to the state that CCD 101 is retained at the zero point O. The zero point O is also the central point of a movable range of the mount stage 15. About 53 milliseconds are needed from setting the power on to finishing the reset.

In the present embodiment, the image-blur suppression mechanism is configured to perform the image-blur suppression after the image-blur suppression switch SW14 is set on and discharge the image-blur suppression after the image-blur suppression switch SW14 is turned off or after the photographing is finished.

In step S2, after the image-blur suppression switch SW14 is set on, the release processing is performed controlled by the processor 104 to drive the stepping motor STM1 to rotate 2 pulses in the clockwise direction at a slow speed of 200 pps and 28 pulses in the clockwise direction at a fast speed of 1000 pps, and then the power to the stepping motor STM1 is shut down after maintained for 5 milliseconds.

Figure 13A:
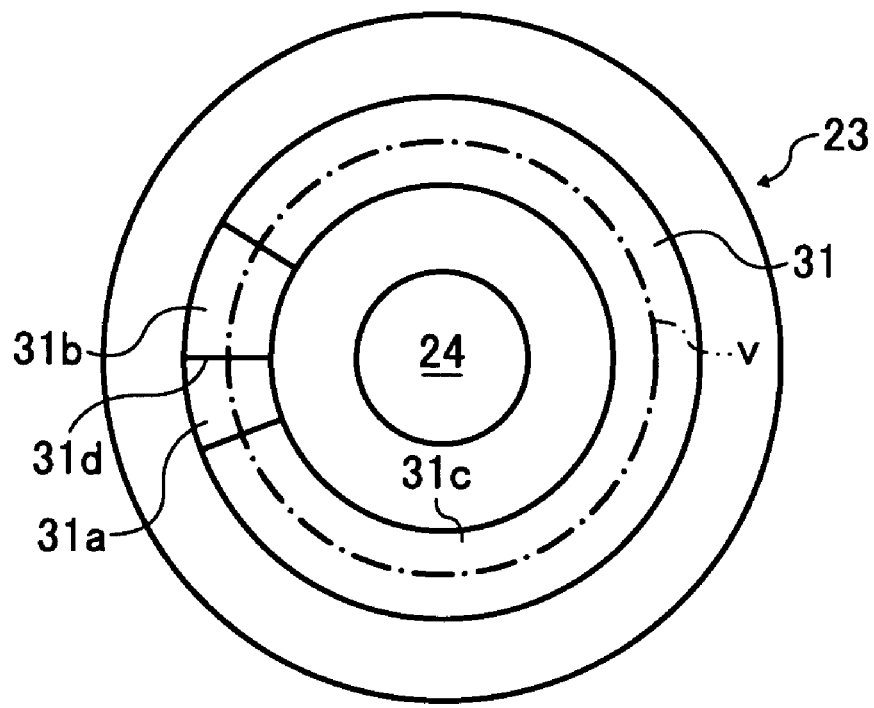
FIG. 13A is a bottom view of the rotation transmitting gear.
Figure 13B:
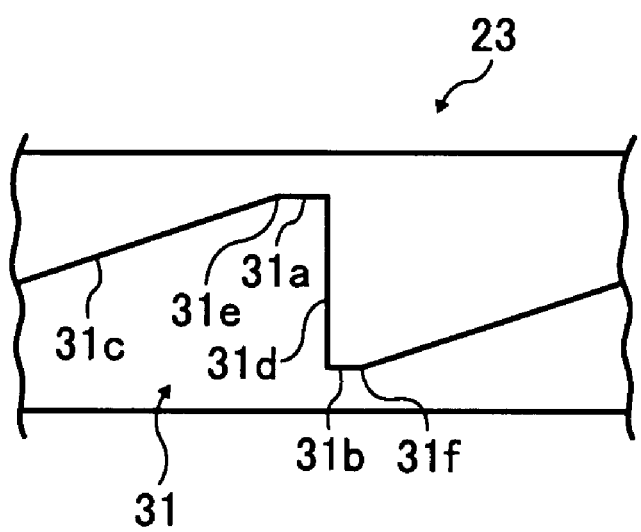
FIG. 13B is a section view of the rotation transmitting gear in FIG. 13A sectioned along a circular dotted and dashed line V.
Figure 13C:
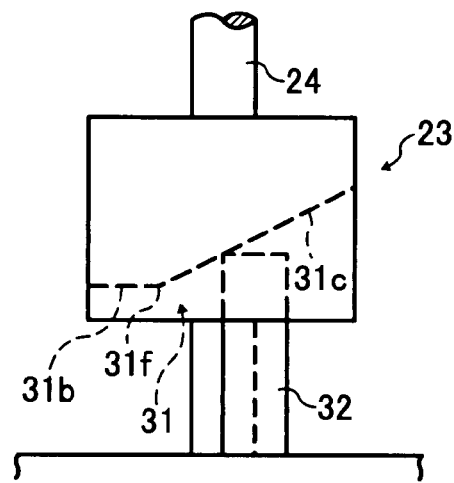
FIG. 13C is a view showing a state when a cam pin slides along an inclination surface of the cam groove to push up the rotation transmitting gear toward a base member.
Figure 13D:
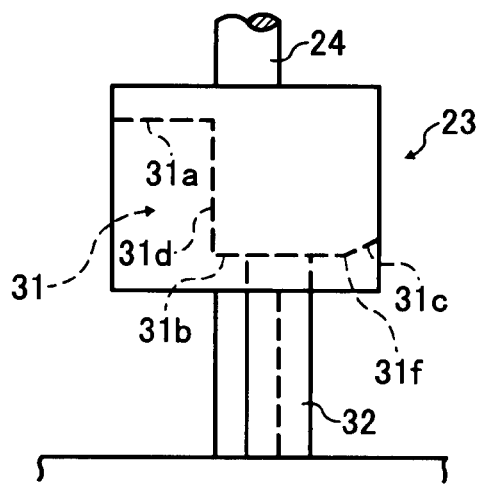
FIG. 13D is a view showing a state when the cam pin is contacted to a apex flat part of the cam groove to push up the rotation transmitting gear to a utmost high position.
Figure 13E:
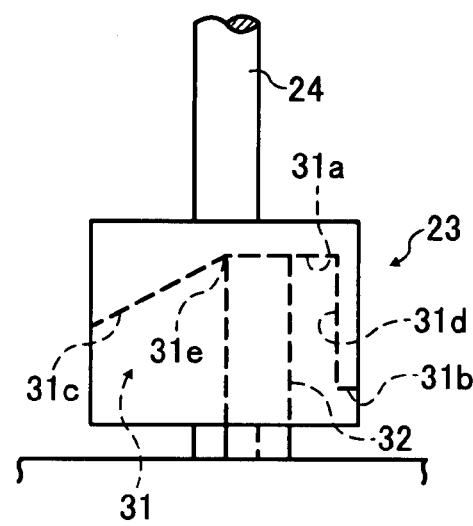
FIG. 13E is a view showing a state when the cam pin is contacted to a valley flat part of the cam groove to push down the rotation transmitting gear to a utmost low position.

The cam pin 32 is positioned at the inclination ending position 31f of the cam groove 31 by the release processing (Referring to FIG. 13D). About 43 milliseconds are needed to move the cam pin 32 from the inclination starting position 32e to the inclination ending position 32f. In other words, it takes about 43 milliseconds to move the cam pin 32 from the holding standby position to the releasing standby position at which the image-blur suppression is performed.

In step S3, after the image-blur suppression switch SW14 is set off or the photographing is performed, the retention processing is performed by the processor 104 to drive the stepping motor STM1 to rotate 2 pulses in the clockwise direction at a slow speed of 200 pps (pulse per second) and 3 pulses in the clockwise direction at a fast speed of 1000 pps. As a result, the cam pin 32 contacts the flat valley floor 31a by passing the flat peak 31b of the cam groove 31 and falling down to the flat valley floor 31a. Then the power to the stepping motor STM1 is shut down after maintained for 5 milliseconds.

The cam pin 32 is positioned at the inclination starting position 31e of the cam groove 31 and the CCD 101 is retained at the central position by the retention processing. When the power is kept on, once after the reset processing is performed, there are performed the release processing and retention processing. It takes about 18 milliseconds to move the cam pin 32 from the releasing standby position to the retention standby position.

According to the image-blur suppression mechanism, the CCD 101 is retained forcibly at the central position of the mount stage 15 by the retention pin 33 formed at the spring retention plate 26, it is expected to decrease a power consumption of the image-blur suppression mechanism even if it is in operation since there is no need to continue supplying a power in order to retain the CCD 101 at the zero point position of the mount stage 15.

9. Configuration of a Detection Circuit of the Image-blur Suppression Mechanism

Figure 21:
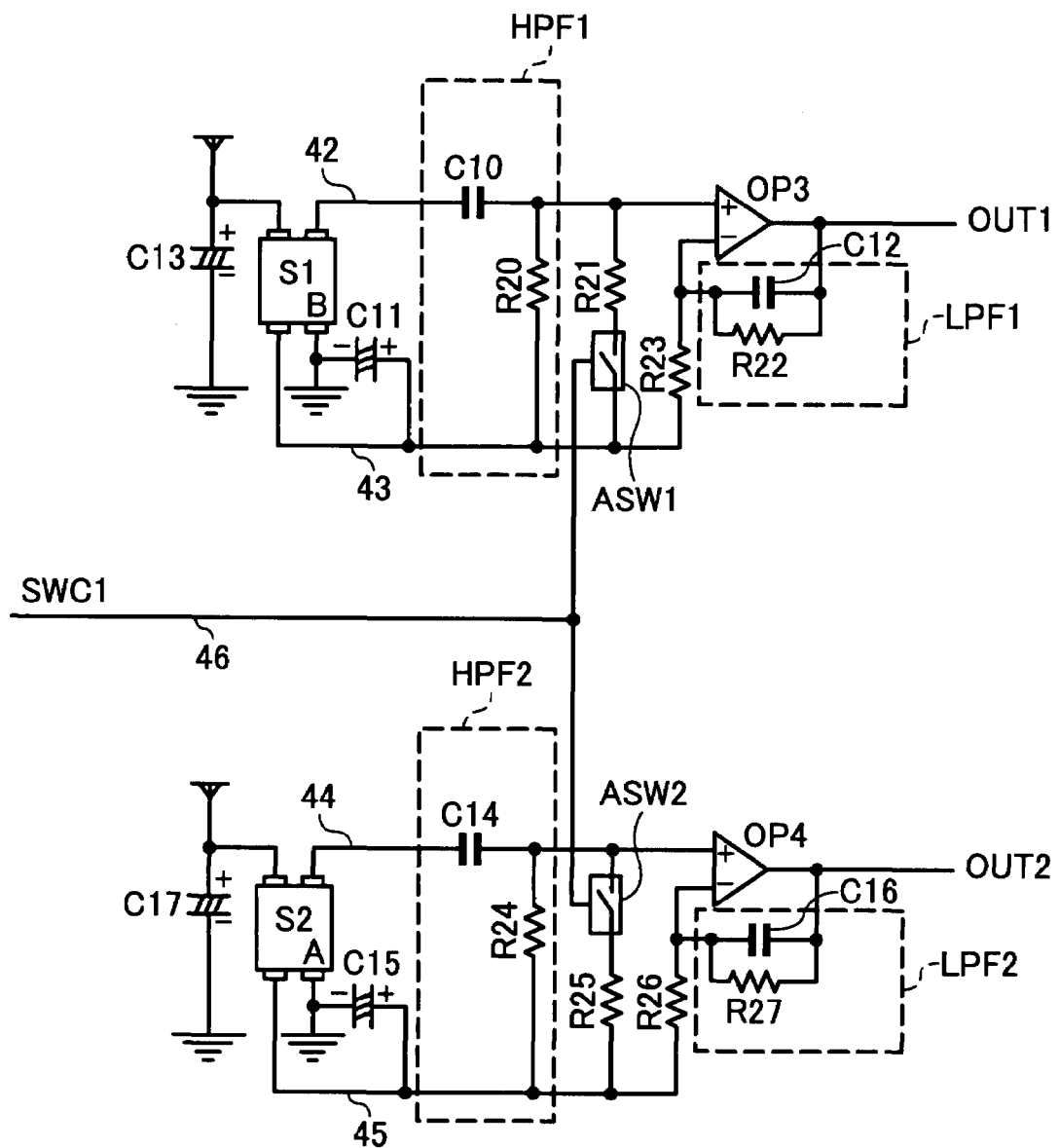
FIG. 21 is a circuit block view showing an example of a detection circuit of an image-blur suppression mechanism.

As shown in FIG. 21, the detection circuit of the image-blur suppression mechanism includes an X axial direction rotation detecting section to detect a rotation of X axial direction, and a Y axial direction rotation detecting section to detect a rotation of Y axial direction.

The X axial direction rotation detecting section includes for example a piezoelectric vibration gyro-sensor S1B of which a first terminal is earthed via a condenser C13, a second terminal is connected to a plus terminal of an operational amplifier OP3 via a condenser C10 provided at a position in a connection line 42, a third terminal is connected to a minus terminal of the operational amplifier OP3 via a resistance R23 provided at a position in a connection line 43, and a fourth terminal is connected to the connection line 43 via a condenser 11 while being earthed.

The plus terminal of the operational amplifier OP3 is connected to the connection line 43 via a resistance R20. The resistance R20 and a series body consisting of the resistance R20 and an alternative switch ASW1 are connected in parallel with each other between the connection lines 42 and 43.

An output terminal of the OP3 is connected to the minus terminal of the OP3 via a condenser C12. A resistance R22 is provided in parallel with the condenser C12. The condenser C10 and the resistance R20 make up a high-pass filter HPF1 and the condenser C12 and the resistance R22 constitute a low-pass filter LPF1. The operational amplifier OP3 amplifies an output from the piezoelectric vibration gyro-sensor S1B and output it from the output terminal of the OP3 as an X axial direction rotation detecting signal OUT1.

The Y axial direction rotation detecting section includes for example a piezoelectric vibration gyro-sensor S2A of which a first terminal is earthed via a condenser C17, a second terminal is connected to a plus terminal of an operational amplifier OP4 via a condenser C17 provided at a position in a connection line 44, a third terminal is connected to a minus terminal of the operational amplifier OP4 via a resistance R26 provided at a position in a connection line 45, and a fourth terminal is connected to the connection line 45 via a condenser 15 while being earthed.

The plus terminal of the operational amplifier OP4 is connected to the connection line 45 via a resistance R24. The resistance R20 and a series body consisting of the resistance R20 and an alternative switch ASW2 are connected in parallel with each other between the connection lines 44 and 45.

An output terminal of the OP4 is connected to the minus terminal of the OP4 via a condenser C16. A resistance R27 is provided in parallel with the condenser C16. The condenser C14 and the resistance R24 make up a high-pass filter HPF2 and the condenser C16 and the resistance R27 constitute a low-pass filter LPF2. The operational amplifier OP4 amplifies an output from the piezoelectric vibration gyro-sensor S2A and output it from the output terminal of the OP4 as a Y axial direction rotation detecting signal OUT2.

An alternative switch controlling signal SWC1 is output to the alternative switches ASW1 and ASW2 via a signal line 46. The alternative switches ASW1 and ASW2 have a function to speed charge the condensers C11 and C15 in order to speed up response speeds of the high-pass filters HPF1 and HPF2, respectively. The processor 104 outputs the alternative switch controlling signal SWC1 to the alternative switches ASW1 and ASW2 at a given time after the power is set on to initialize the alternative switches ASW1 and ASW2. The detecting signals OUT1 and OUT2 from the respective gyro-sensors S1B and S2A are retrieved by the A/D converter 10411 every T seconds. Thus, θ yaw (t) and θ pitch (t) may be obtained from equations in the follows:

$$\theta\,\mathrm{yaw}(t) = \Sigma\omega\,\mathrm{yaw}(i) \times T$$

$$\theta\,\mathrm{pitch}(t) = \Sigma\omega\,\mathrm{pitch}(i) \times T$$

wherein
θ yaw (t): angular variation in YAW direction;
θ pitch (t): angular variation in PITCH direction;
ω yaw (t): instant angular velocity in YAW direction; and
ω pitch (t): instant angular velocity in PITCH direction.

A focus length f is determined from a zoom point zp and a focus point fp. Thus, D yaw (t), D pitch (t), θ yaw (t) and θ pitch (t) meet equations listed in the follows:

$$D\,\mathrm{yaw}(t) = f \times \tan(\theta\,\mathrm{yaw}(t)) \quad (\mathrm{i})$$

$$D\,\mathrm{pitch}(t) = f \times \tan(\theta\,\mathrm{pitch}(t)) \quad (\mathrm{ii})$$

wherein
D yaw (t): displacement amount of an image along X axial direction corresponding to rotation in YAW direction; and D pitch (t): displacement amount of an image along Y axial direction corresponding to a rotation in PITCH direction.

In other words, D yaw (t) and D pitch (t) correspond to a displacement amount of the CCD 101 which should be moved along Y axial direction.

When there are rotation displacements along YAW and PITCH directions occurred from the camera shake, a target position of the CCD 101 is calculated according to equations (i) and (ii), and the mount stage 15 is driven to move so that a difference between a real position of the CCD 101 along the X and Y axial directions detected by the position detecting element 1252 and the target position of the CCD 101 becomes zero. This control is performed every T seconds.

Furthermore, when the detected outputs from the gyro-sensors S1B and S2A are of a value of zero, the mount stage 15 is controlled so that the CCD 101 is translated so as to follow a translation displacement Xd of the camera main body.

10. Control Circuit of the Image-blur Suppression Mechanism

Figure 22:
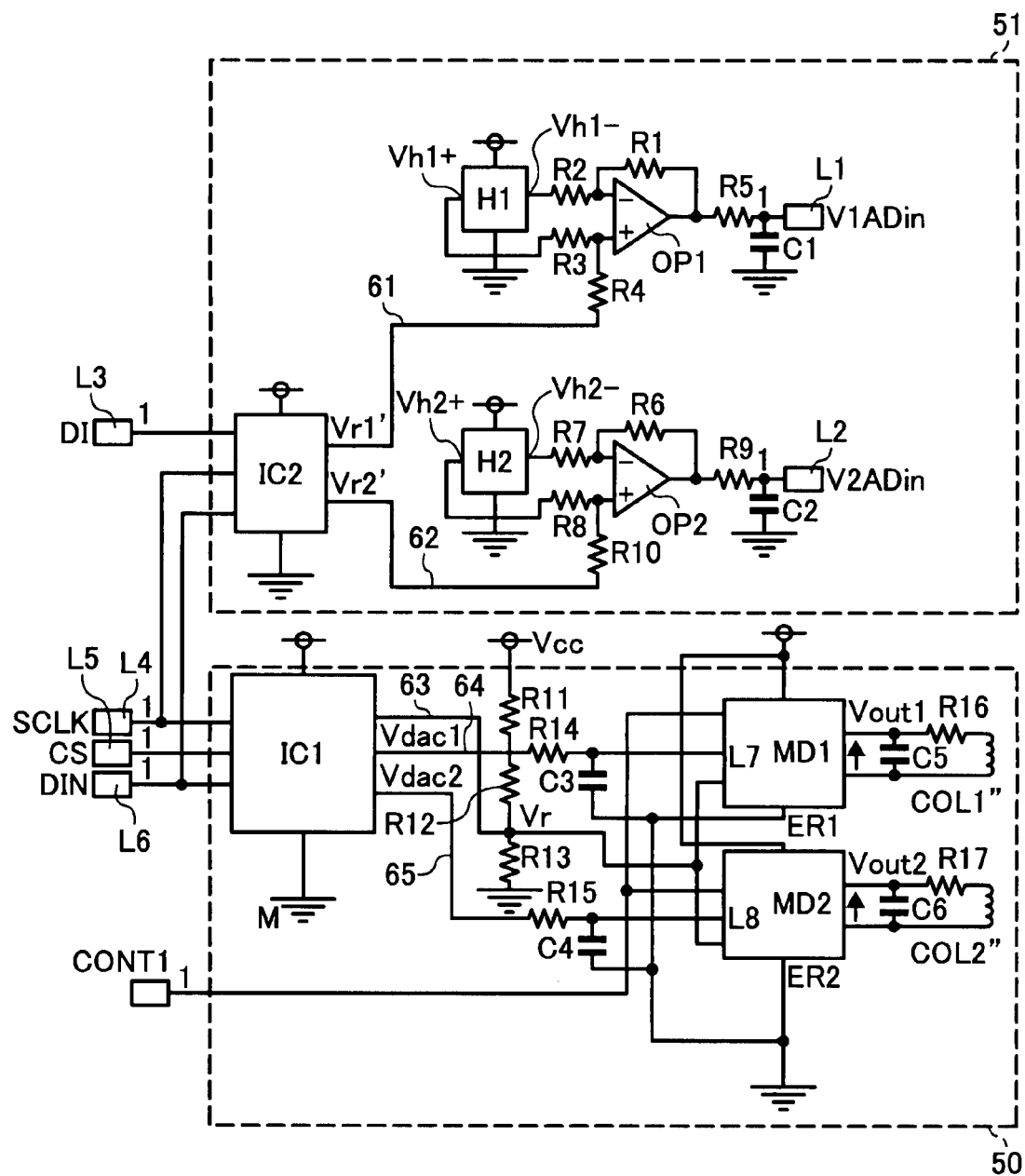
FIG. 22 is a circuit block view showing an example of a control circuit of the image-blur suppression mechanism.

As shown in FIG. 22, the control circuit of the image-blur suppression mechanism includes a feedback circuit 50 and a position-voltage setting circuit 51.

Hall elements H1 and H2 constitute a part of the position-voltage setting circuit 51. A predefined voltage Vh1− is applied to the hall element H1 (1252a). One terminal of the hall element H1 is connected to a minus terminal of an operational amplifier OP1 via a resistance R2 and the other terminal is connected to a plus terminal of the operational amplifier OP1 via a resistance R3.

An output terminal of the operational amplifier OP1 is connected to an input port L1 of the processor 104 via a resistance R5 and to the minus terminal of itself via a resistance R1. In addition, a connection point of the resistance R5 and the output port L1 is earthed via a condenser C1.

A predefined voltage Vh2− is applied to the hall element H2 (1252b). One terminal of the hall element H2 is connected to a minus terminal of an operational amplifier OP2 via a resistance R7 and the other terminal is connected to a plus terminal of the operational amplifier OP2 via a resistance R3.

An output terminal of the operational amplifier OP2 is connected to an input port L2 of the processor 104 via a resistance R9 and to the minus terminal of itself via a resistance R6. In addition, a connection point of the resistance R9 and the output port L2 is earthed via a condenser C2.

An output port L3 of the processor 104 is connected to a D/A converter circuit IC2 included in the position-voltage setting circuit 51 and output ports L4 and L6 are connected to both the D/A converter circuit IC1 and the D/A converter circuit IC2. An output port L5 is connected to the D/A converter circuit IC1.

Two output lines 61 and 62 are connected to the D/A converter circuit IC2 among which the output line 61 is connected to the plus terminal of the operational amplifier OP1 through a resistance R4 and the other line 62 is connected to the plus terminal of the operational amplifier OP2 through a resistance R10.

A chip selector signal DI from the output port L3, a clock signal SCLK from the output port L4 and a compensation digital data DIN from the output port L6 are input to the D/A converter circuit IC2 which has a function to convert the compensation digital data from digital to analogue.

The D/A converter circuit IC1 is configured as a part of the feedback circuit 50. A common line 63 and two output lines 64 and 65 are connected to the D/A converter circuit IC1. The common line 63 is connected to the coil drives MD1 and MD2. The output line 64 is connected to an input terminal L7 of the coil drive MD1 through a resistance R14 and the output line 65 is connected to an input terminal L8 of the coil drive MD2 through a resistance R15.

A connection point of the resistance R14 and the input terminal L7 is connected to an earth terminal ER1 of the coil drive MD1 through a condenser C3 and a connection point of the resistance R15 and the input terminal L8 is connected to an earth terminal ER2 of the coil drive MD2 through a condenser C4. The common line 63 is connected to a power Vcc through series resistances R12 and R11, and is earthed through a resistance R13 at a connection point between the common line 63 and the resistance R12.

A control signal CONT1 from the processor 104 is input to both the coil drives MD1 and MD2. Output terminals of the coil drive MD1 are connected with a series body including a resistance R16 and a series coil body COL1″ having the coil bodies COLL and COL1′ in series, in parallel to the series body a condenser C5 is connected.

Similarly, output terminals of the coil drive MD2 are connected with a series body including a resistance R17 and a series coil body COL2″ having the coil bodies COL2 and COL2′ in series, in parallel to the series body a condenser C6 is connected.

The series coil bodies COL1″ and COL2″ are configured to drive the mount stage 15 along X axial direction and Y axial direction, respectively.

Predefined voltages Vh1− and Vh2+ are applied to the hall elements H1 and H2, respectively. When the detected outputs from the gyro-sensors S1B and S2A are of a value of zero and when the CCD 101 is in the central position (zero point) of the movable range, detected output voltages for the hall elements H1 and H2 are configured to be Vh1 and Vh2, respectively, and analogue output voltages for the input ports L1 and L2 of the processor 104 to be V1ADin and V2ADin, respectively. The output voltages V1ADin and V2ADin are practically measured.

The practically measured output voltages V1ADin and V2ADin vary in relation to assembly errors concerning such as mechanical positions between the permanent magnets 16a to 16d and the hall elements H1 and H2, and attached positions between the hall elements H1 and H2 with respect to the mount stage 15 and the series bodies COL1″ and COL2″. In addition, the hall elements H1 and H2 vary characteristically themselves.

Therefore, if some kind of compensation is not performed, detected values of the hall elements H1 and H2 with respect to the zero point would be different in each camera, and this may bring to a problem that it is impossible to carry out an accurate image-blur suppression.

Thus, compensation voltages Vr1′ and Vr2′, which are input to operational amplifiers OP1 and OP2 respectively from the D/A converter IC2, are set to compensate variations on the output voltages V1ADin and V2ADin, which are practically measured when the series bodies COL1″ and COL2″ are not powered to control the CCD 101 positioned at the zero point, so that they have set standard voltage values.

In order to set a roughly center value, for example 1.7 volts, of an operational voltage range for the operational amplifiers OP1 and OP2 as the set standard voltage value, the processor 104 performs computations described in the follows.

In the present embodiment, the resistances are set but not limited to meet the following conditions for convenience: R2=R3=R7=R8, R1=R4=R6=RIO.

If R2=R3=R7=R8, R1=R4=R6=R10, then V1ADin and V2ADin meet equations:

$$V1ADin=R1/R2\times((Vh1+)-(Vh1-))+Vr1'$$

$$V2ADin=R1/R2\times((Vh2+)-(Vh2-))+Vr2'$$

The processor 104 acquires the compensation voltages Vr1′ and Vr2′ by performing a computation based on the above mentioned equations. As a result, the detected values of the hall elements H1 and H2 with respect to the zero point may vary in relation to assembly errors concerning such as mechanical positions between the permanent magnets 16a to 16d and the hall elements H1 and H2, and attached positions between the hall elements H1 and H2 with respect to the mount stage 15 and the series bodies COL1″ and COL2″ but constantly.

The processor 104, together with the D/A converter circuit IC2, constitute a part of the compensation circuit which outputs a compensation value in order to set the detected values of the hall elements H1 and H2 as the set standard voltage values no matter how the detected values may vary. In addition, the processor 104 functions as a computation device to obtain compensation values by performing a computation on the set standard voltage values.

Figure 23:
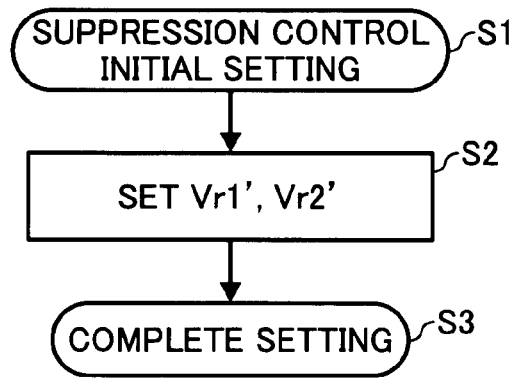
FIG. 23 is a flow chart showing an example of a setting procedure of variation compensation according to the present invention.

As shown in a flow chart including steps S1 to S3 in FIG. 23, an initial setting for the image-blur suppression control is performed at a final stage in a camera assembly factory before factory shipment.

Figure 24:
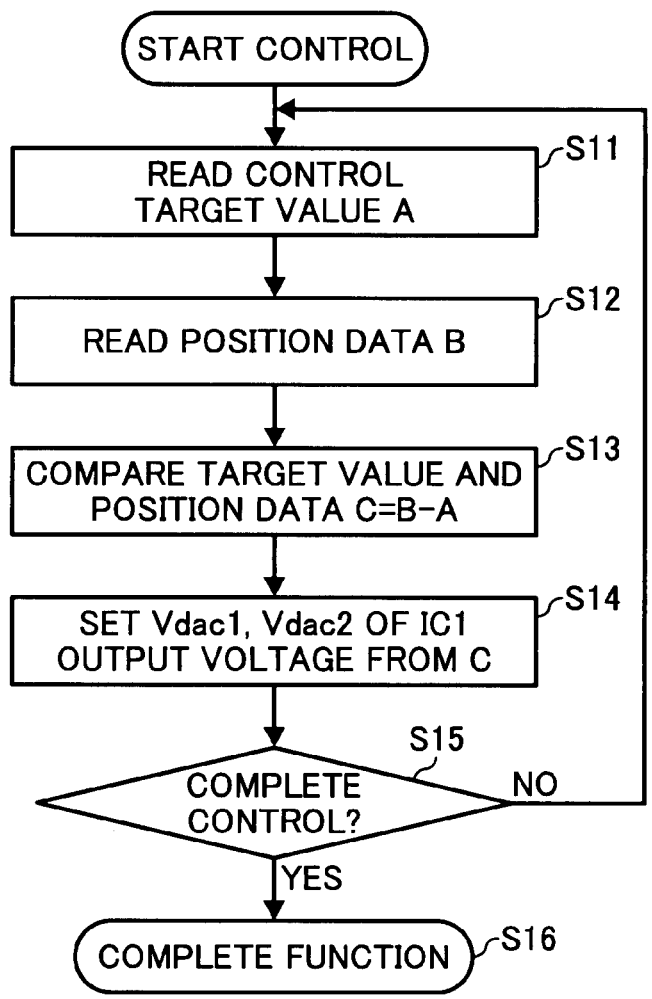
FIG. 24 is a flow chart showing an example of a control procedure of the image-blur suppression mechanism.

The actual control is shown in FIG. 24. The processor 104 retrieves a controlling target value which is computed from the detecting output signals OUT1 and OUT2 from the detection circuit of the image-blur suppression mechanism (Step S11), then retrieves the real output voltages V1ADin and V2ADin corresponding to actual positions obtained from the hall elements H1 and H2, respectively (Step S12), and a difference value is computed by the processor 104 between the above two (Step S13).

Based on the difference value, the processor 104 outputs the control data to the D/A converter circuit IC1 which outputs control voltages Vdac1 and Vdac2 (Step S14). The control voltages Vdac1 and Vdac2 are input to the coil drives MD1 and MD2 which output driving voltages Vout1 and Vout2 to the series coil bodies COL1″ and COL2″, respectively.

The driving voltages Vout1 and Vout2 are determined according to the following equations:

$$Vout1=(Vdac1-Vr)\times K$$

$$Vout2=(Vdac2-Vr)\times K$$

wherein, Vr is a division voltage and K is a ratio constant based on the division voltage Vr.

The CCD 101 is attracted or repelled by the permanent magnets of 16a to 16d and the series coil bodies COL1″ and COL2″ to move in a direction determined by that whether the driving voltages Vout1 and Vout2 are of positive or negative voltages. The detecting values of the hall elements H1 and H2 vary accordingly. Though the real output voltages V1ADin and V2ADin may vary according to the variations of the detecting values of the hall elements H1 and H2, they are fed back to the processor 104, thus it is possible to make the CCD 101 follow a target position instantly even though the control target value based on the detecting output voltages from the detection circuit of the image-blur suppression varies (Step S15). The control is finished when the photographing has been performed (Step S16).

VARIANT EXAMPLE

Figure 25:
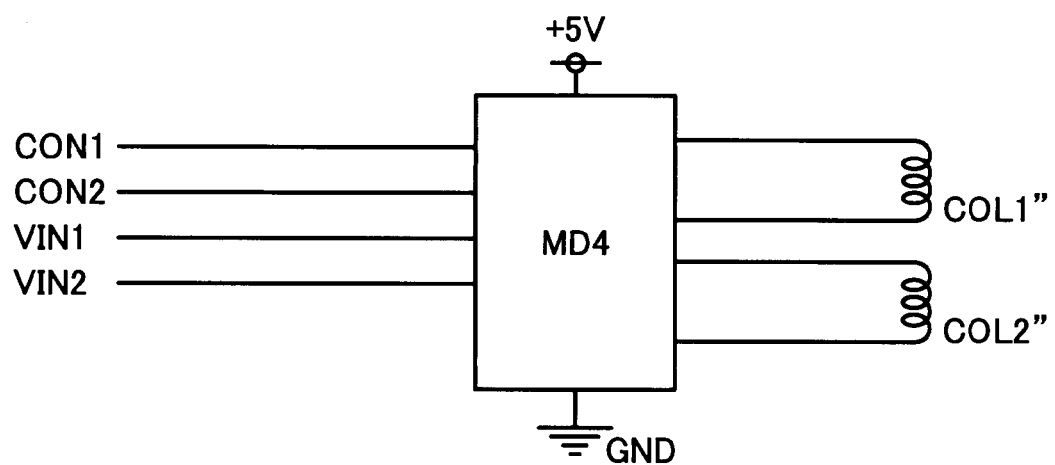
FIG. 25 is a circuit block view showing a variant example of a feedback circuit.

A variant example of the feedback circuit 50 is shown in FIG. 25. In this variant example, the processor 104 controls a coil driver MD4 according to a PWM control to perform the power control to the series coil bodies COL1" and COL2".

In other words, pulse voltages Vin1 and Vin2 are input to the coil driver MD4 together with a positive direction signal CON1 and a negative direction signal CON2. The voltages applied to the series coil bodies COL1" and COL2" are proportional to a lasting time duration of high level pulse signals of the pulse voltages Vin1 and Vin2.

11. Photographing Detail when the Image-blur Suppression Mechanism is on

Figure 26:
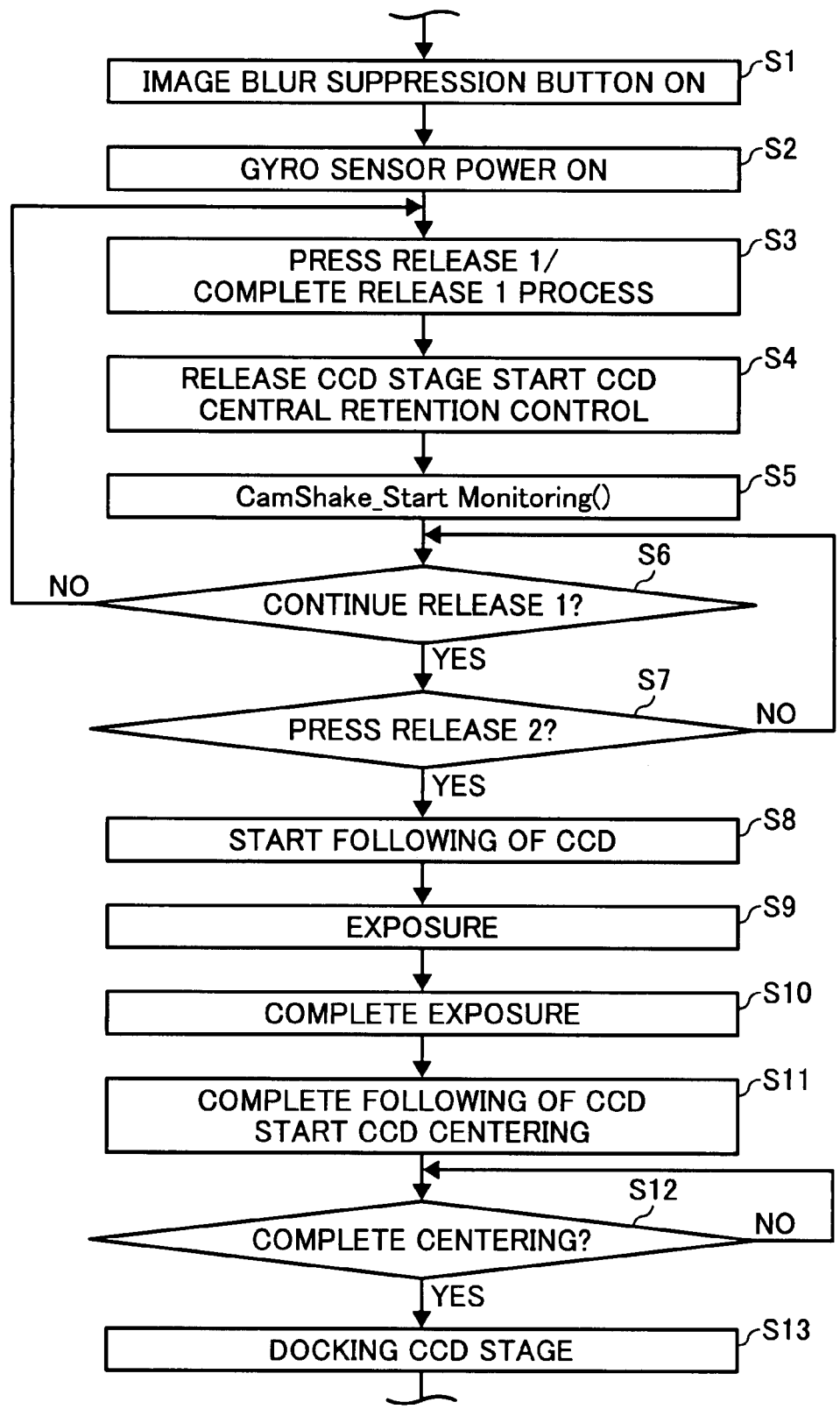
FIG. 26 is a flow chart showing a suppression procedure of the image-blur suppression mechanism of the digital camera according to the present invention.

As shown in FIG. 26, when the image-blur suppression switch SW14 is set on in step S1, the gyro sensors S1A and S2A are powered on (Step S2). After the release switch SW1 is half pressed, an auto focus operation is initialized in step S3. Simultaneously, a forcible mechanical fixation of the mount stage 15 is released and a retention control of the CCD 101 at the zero point is initialized when the series coil bodies COL1" and COL2" are powered on in step S4.

Then a monitor processing is initialized to monitor the camera shake in step S5. In step S6, the processor 104 determines whether the half press of the release switch SW1 is ongoing. The procedure returns back to step S3 if the half press of the release switch SW1 is released. If the half press of the release switch SW1 is ongoing, the processor 104 determines whether the release switch SW1 is fully pressed in step S7. If the release switch SW1 is not fully pressed, the procedure returns back to step S6.

After the release switch SW1 is fully pressed, the image-blur suppression mechanism controls the CCD 101 to follow a movement of the subject image in step S8 and an exposure is performed in step S9. When the exposure is finished in step S10, the CCD 101 is stopped to follow the subject image and the mount stage 15 is returned back to the zero point position according to the power control on the series coil bodies COL1" and COL2" in step S11. Whether the mount stage 15 is returned back to the zero point position is determined in step S12 and the mount stage 15 is fixed at the zero point position forcibly after it is determined to have returned back to the zero point position in step S13.

There are two modes for the operation timing of the release switch SW1.

Figure 27:
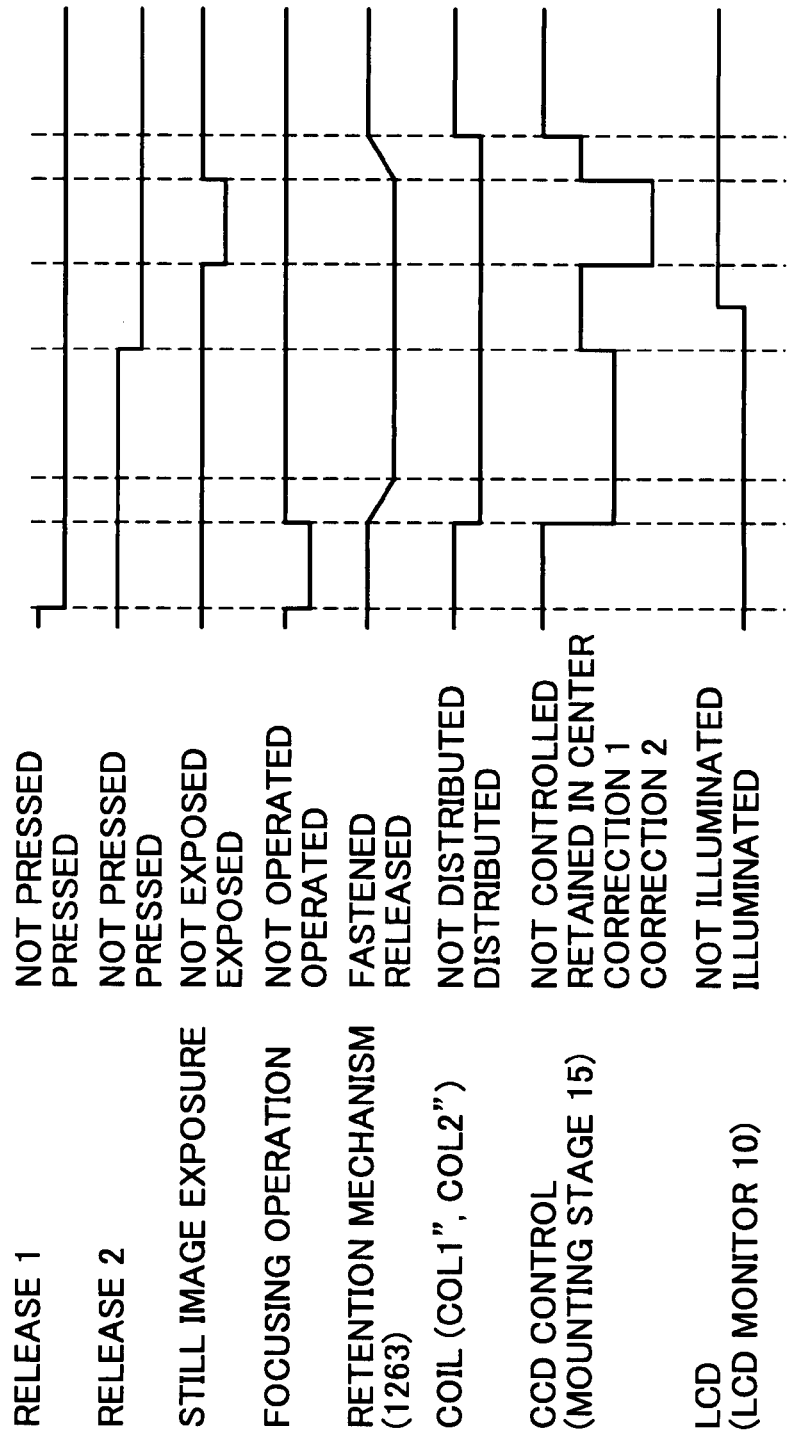
FIG. 27 is a timing chart showing an example of the suppression procedure of the image-blur suppression mechanism when a release switch is half and fully pressed in a two-stage press procedure according to the present invention.

FIG. 27 is a timing chart of a compensation procedure for the image-blur suppression mechanism when the release switch SW1 is half and fully pressed in a two-stage press procedure.

Herein the two-stage press procedure refers to a discontinuous release operation between an operation when the release switch SW1 is half pressed and an operation when the release switch SW1 is fully pressed. For example, a photographing operation in which a chance is taken to press fully the release switch SW1 for an exposure while the release switch SW1 is being half pressed.

When the release switch SW1 is half pressed, the digital camera starts a focus operation. In this state, the zero point retention mechanism 1263 still keep the mount stage 15 fixed at the zero point position and the series coil bodies COL1" and COL2" are not powered on. The subject image is displayed on the LCD monitor 10 in this state.

As soon as the focus operation is finished, the processor 104 starts to power the stepping motor STM1 of the zero point retention mechanism 1263 and accordingly the forcible mechanical fixation of the mount stage 15 is released. At the same time, the series coil bodies COL1" and COL2" are powered on. And thus the image-blur suppression is performed when the release switch SW1 is half pressed (Release 1). After the release switch SW1 is fully pressed (Release 2), the mount stage 15 is returned once back to the central position according the power control on the series coil bodies COL1" and COL2", the LCD monitor 10 is powered off after some time.

The mount stage 15 is controlled to follow the movements of the subject image resulted from the camera shake while the image is being exposed. As soon as the image exposure is finished the mount stage 15 is returned back to the central position according to the power control on the series coil bodies COL1" and COL2", and then the processor 104 begins to power the stepping motor STM1 of the zero point retention mechanism 1263 and accordingly the mount stage 15 is mechanically and forcibly fixed. After that, the power applied to the series coil bodies COL1" and COL2" is stopped.

Since the image-blur suppression is performed in release 1, thus even though there is a camera shake to the camera, it is possible for a user to view the subject image without image blurring on the LCD monitor 10.

The subject image may be constructed in the release 2 with a deviation to that in the release 1 when the mount stage 15 is returned once to the central position in the release 2; since it is possible to confirm the subject image just before photographed when the mount stage 15 is returned once to the central position in the release 2 according to the present embodiment, thus, it is possible to conform the subject image construction before the subject image is photographed or exposed.

Figure 28:
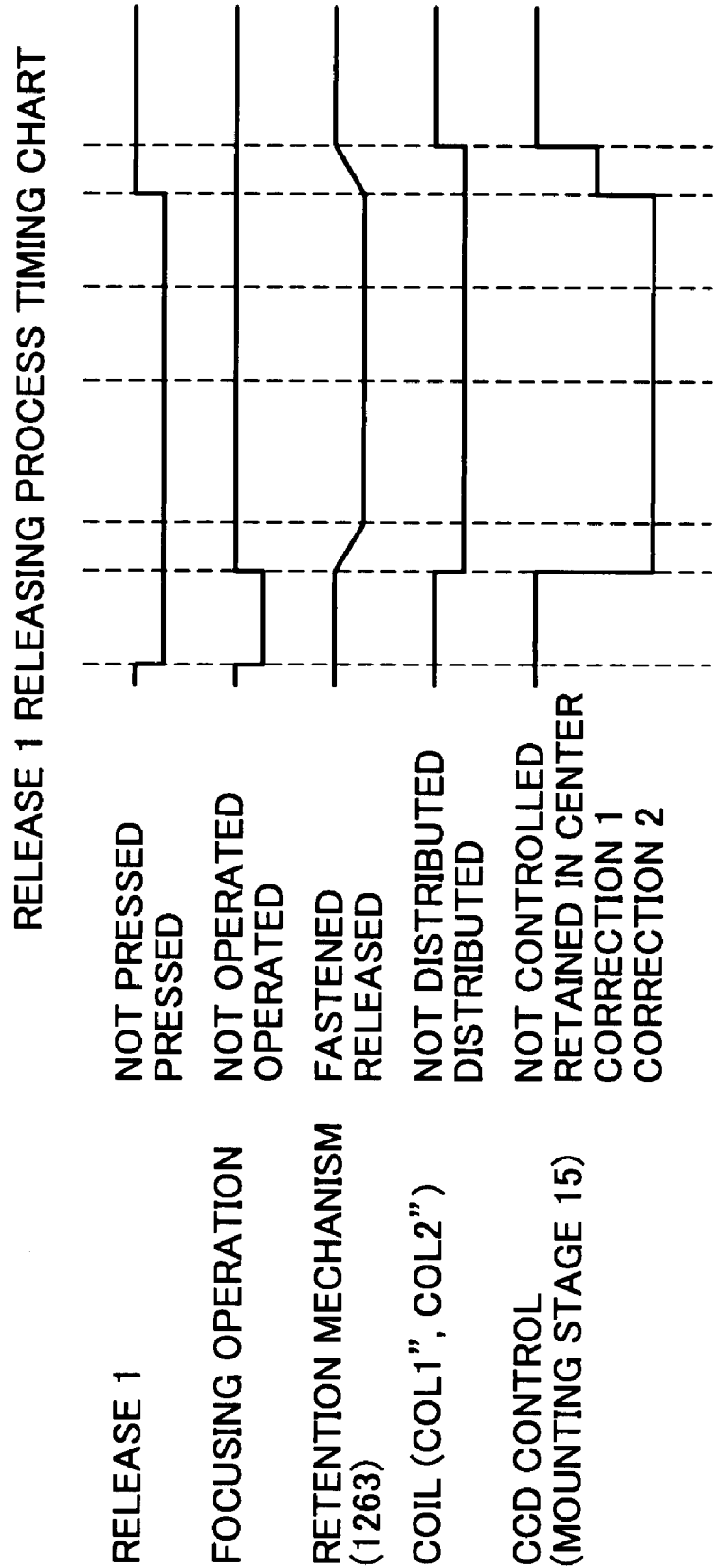
FIG. 28 is a timing chart showing an example of a release procedure of the image-blur suppression mechanism according to the present invention.

As shown in FIG. 28, in a case when the release switch SW1 is half pressed and then released without being fully pressed, simultaneous to the half press of the release switch SW1, the focus operation is initialized.

As soon as the focus operation is finished, the processor 104 starts to power the stepping motor STM1 of the zero point retention mechanism 1263 and accordingly the forcible mechanical fixation of the mount stage 15 is released. At the same time, the series coil bodies COL1" and COL2" are powered on, thus the image-blur suppression is performed when the release switch SW1 is half pressed (Release 1).

When the release switch SW1 is released while it's being half pressed, the mount stage 15 is returned to the central position according to the power control on the series coil bodies COL1" and COL2", and then the processor 104 starts to power the stepping motor STM1 of the zero point retention mechanism 1263 and accordingly the mount stage 15 is mechanically and forcibly fixed. After that, the power applied to the series coil bodies COL1" and COL2" is stopped.

Figure 29:
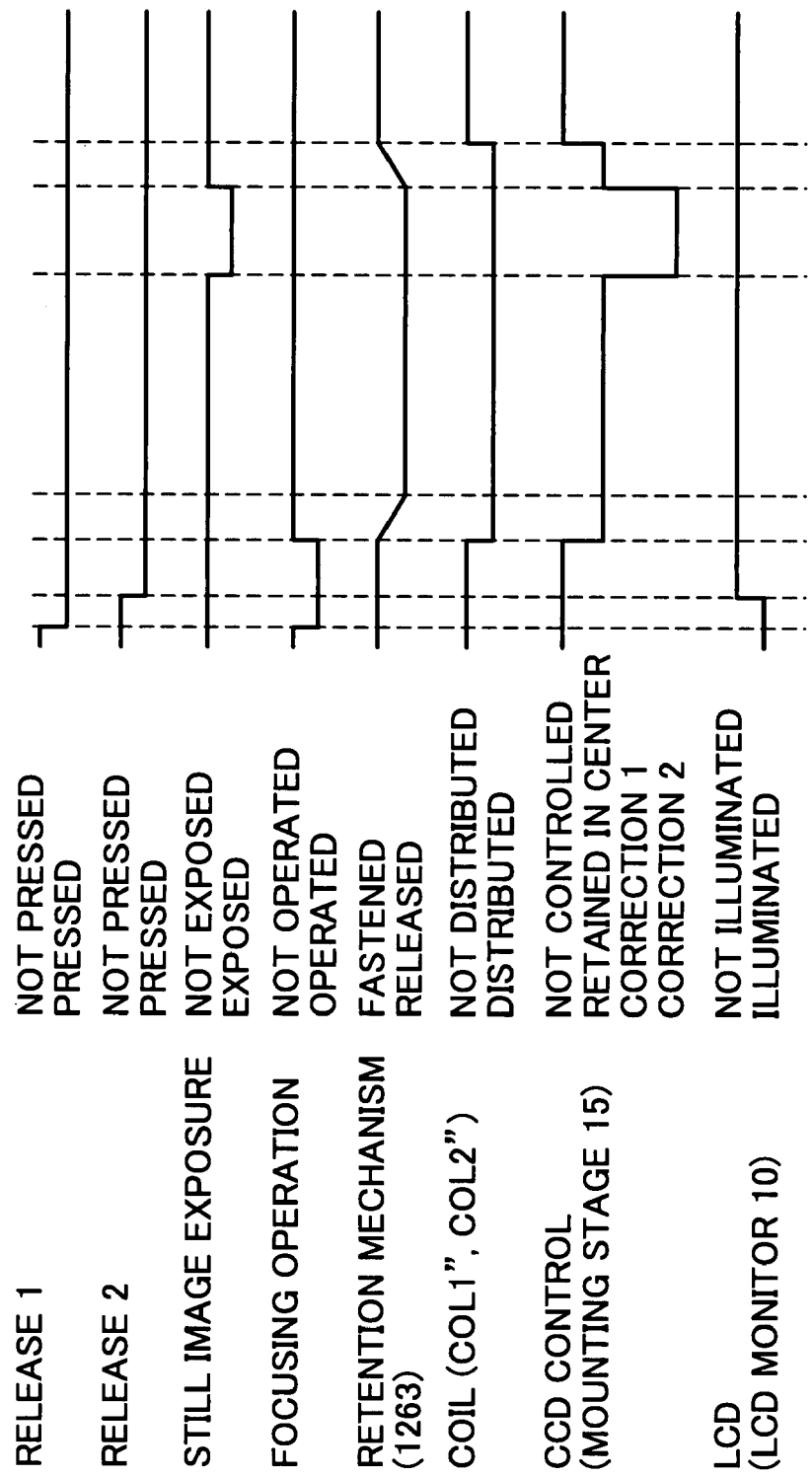
FIG. 29 is a timing chart showing an example of the suppression procedure of the image-blur suppression mechanism when the release switch is fully pressed at a burst according to the present invention.

FIG. 29 is a timing chart explaining the compensation procedure of the image-blur suppression mechanism when the release switch is fully pressed at a burst.

Herein the full press at a burst refers to a continuous release operation between an operation when the release switch SW1 is half pressed (Release 1) and an operation when the release switch SW1 is fully pressed (Release 2). For example, a photographing operation in which a chance is taken to press fully a release switch for an exposure while the release switch is being half pressed. For example, a photographing operation in which the release switch SW1 is pressed fully for an exposure right after it is half pressed.

When the release switch SW1 is half pressed, the focus operation of the digital camera is initialized and the LCD monitor 10 is set to a state for displaying the subject image. And when the release switch SW1 is pressed fully right after it is half pressed, the LCD monitor 10 is powered off at the same time.

After the focus operation is finished, the processor 104 starts to power the stepping motor STM1 of the zero point retention mechanism 1263 and accordingly the forcible mechanical fixation of the mount stage 15 is released. At the same time, the series coil bodies COL1" and COL2" are powered on, and the mount stage 15 is returned to the central position according to the power control on the series coil bodies COL1" and COL2". Accordingly, the image-blur suppression is performed.

In other words, the mount stage 15 is controlled to follow the movements of the subject image resulted from the camera shake while the central position maintenance of the mount stage 15 is being performed according to the power control on the series coil bodies COL1" and COL2" and the exposure on the subject image is being initialized. As soon as the exposure on the subject image is finished, the mount stage 15 is returned back to the central position according to the power control on the series coil bodies COL1" and COL2", and then the processor 104 starts to power the stepping motor STM1 of the zero point retention mechanism 1263 and accordingly the mount stage 15 is mechanically and forcibly fixed. After that, the power applied to the series coil bodies COL1" and COL2" is stopped.

In the case when the release switch SW1 is fully pressed at a burst, there is no need to confirm the subject image construction in the release 2 since it is presumed that it has been done in the release 1, and in addition it is considered that there is no need to confirm the subject image construction even after the mount stage 15 is returned back to the central position once in the release 2, thus, it is expected to simplify the image-blur suppression procedure.

Furthermore, since the LCD monitor 10 is powered off in the focus operation, it is possible to avoid unnecessary battery consumption.

Figure 9A:
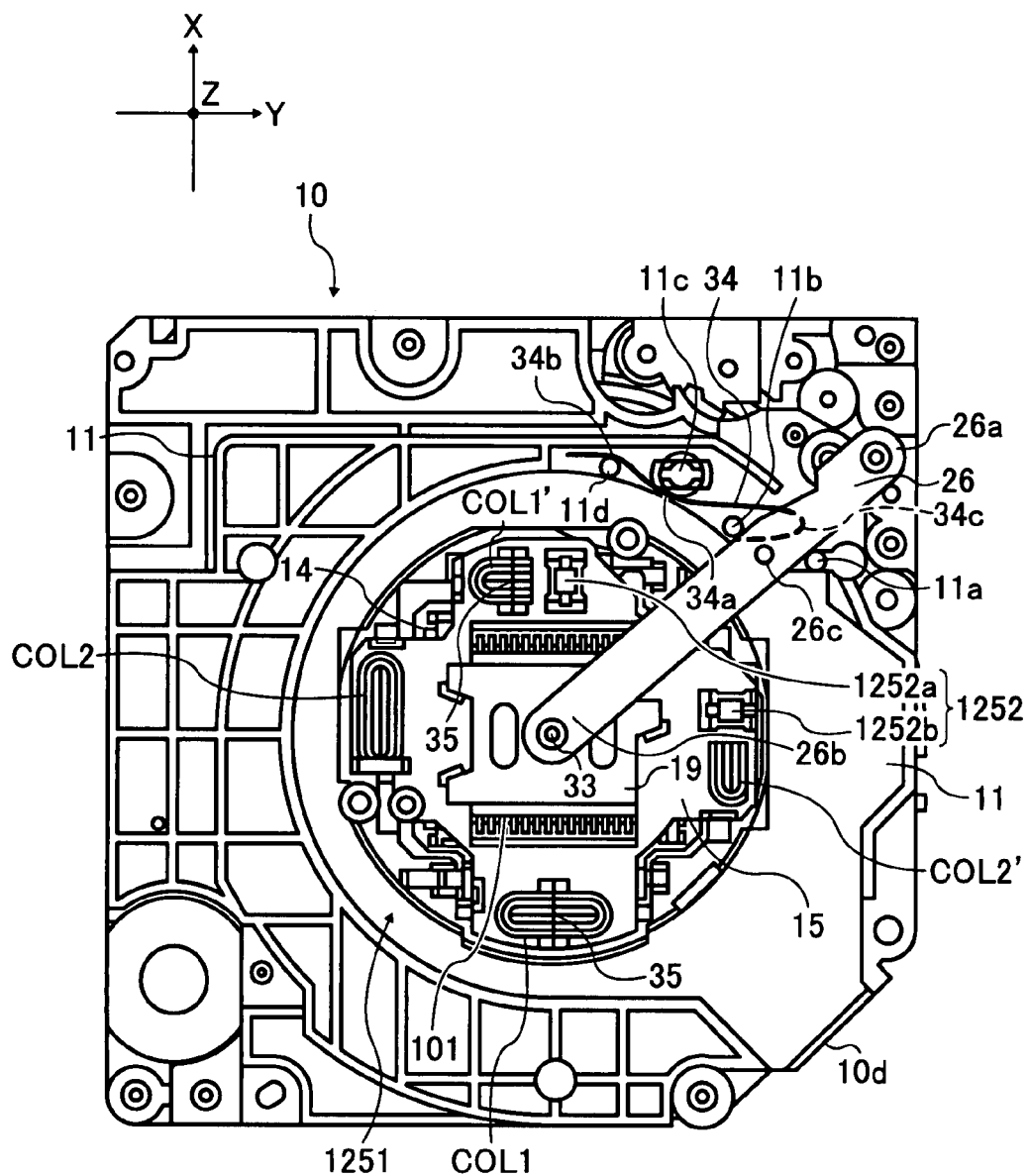
FIG. 9A is a view showing that a flexible base plate is not mounted and FIG. 9B is a view showing that the flexible base plate is mounted.
Figure 9B:
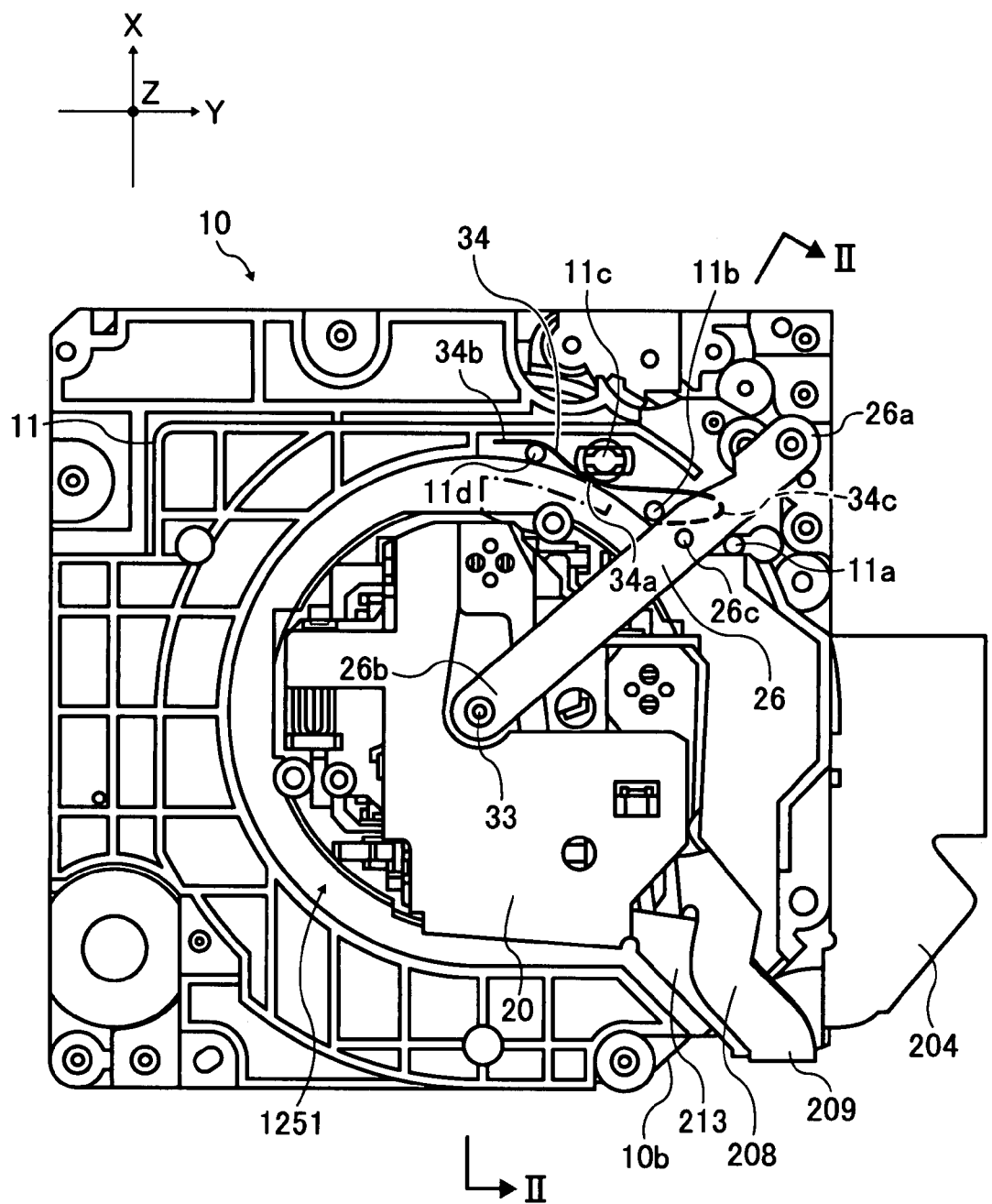

In addition, as shown in FIG. 9A, when the mount stage 15 is forcibly pressed to the zero point position mechanically, it is possible to prevent the mount stage 15 from guttering along Z axial direction since the adsorption bar 35 is maintained to the permanent magnets 16b and 16d through adsorption force. Furthermore, even though the mount stage 15 is not at the zero point position, it may still be maintained the permanent magnets 16b and 16d through adsorption force, thus, the gutter of the mount stage 15 along Z axial direction may also be prevented.

Although the present invention has been explained in relation to its preferred embodiments and drawings but not limited, it is to be understood that other possible modifications and variations made without departing from the spirit and scope of the invention will be comprised in the present invention. Therefore, the appended claims encompass all such changes and modifications as falling within the true spirit and scope of this invention.

What is claimed is:

1. A photographing apparatus, comprising:
   an image-blur suppression mechanism which moves a photographing element on a photographing plane of which a subject image is formed in an XY plane which is parallel to the photographing plane to follow a displacement of the subject image caused by a camera shake based on a target value obtained by setting an intersection point of a Z axis which is a photographing optical axis and the photographing plane which is perpendicular to the Z axis as a zero point to calculate a displacement amount of the subject image which is caused by the camera shake detected on a main body from the zero point as the target value, the XY plane being a plane including X and Y axes perpendicular to the Z axis, respectively;
   a computation device which is provided in the main body to process signals from the photographing element and drive the image-blur suppression mechanism; and
   a flexible base plate which is disposed in the main body with one end connected to the photographing element and the other end fixed relative to the photographing optical axis for connecting the computation device,
   wherein the image-blur suppression mechanism includes a guide mechanism configured to guide the photographing element in a direction of each of the X and Y axes,
   wherein the flexible base plate includes a connection extension section which is extended to connect the one end to the other end and has a first extension portion which is extended along the XY plane starting from the one end, a second extension portion which is connected to the first extension portion extending toward the subject viewing from the photographing element, a third extension portion which is connected to the second extension portion extending parallel to the XY plane, and a fourth extension portion which is connected to the third extension portion extending in a direction away from the subject viewing from the photographing element;
   the connection extension section is folded through a plastic deformation to form a folding line between the first and second extension portions, the second and third extension portions, the third and fourth extension portions, and the fourth extension portion and the other end, respectively; and
   wherein one of an intersection line between the second extension portion and the third extension portion and an intersection line between the third extension portion and the fourth extension portion is disposed parallel to the X axis and the other of the intersection line between the second extension portion and the third extension portion and the intersection line between the third extension portion and the fourth extension portion is disposed parallel to the Y axis.

2. A photographing apparatus, comprising:
   an image-blur suppression mechanism which moves a photographing element on a photographing plane of which a subject image is formed in an XY plane which is parallel to the photographing plane to follow a displacement of the subject image caused by a camera shake based on a target value obtained by setting an intersection point of a Z axis which is a photographing optical axis and the photographing plane which is perpendicular to the Z axis as a zero point to calculate a displacement amount of the subject image which is caused by the camera shake detected on a main body from the zero point as the target value, the XY plane being a plane including X and Y axes perpendicular to the Z axis, respectively;
   a computation device which is provided in the main body to process signals from the photographing element and drive the image-blur suppression mechanism; and
   a flexible base plate which is provided in the main body with one end connected to the photographing element and the other end fixed relative to the photographing optical axis for connecting the computation device,
   wherein the image-blur suppression mechanism includes a guide mechanism configured to guide the photographing element in a direction of each of the X and Y axes,
   wherein the flexible base plate includes a connection extension section which is extended to connect the one end to the other end and has a first extension portion which is extended along the XY plane starting from the one end, a second extension portion which is connected to the first extension portion extending in a direction away from the subject viewing from the photographing element, a third extension portion which is connected to the second extension portion extending parallel to the XY plane, and a fourth extension portion which is connected to the third extension portion extending toward the subject viewing from the photographing element;

the connection extension section is folded through a plastic deformation to form a folding line between the first and second extension portions, the second and third extension portions, the third and fourth extension portions, and the fourth extension portion and the other end, respectively; and wherein one of an intersection line between the second extension portion and the third extension portion and an intersection line between the third extension portion and the fourth extension portion is disposed parallel to the X axis and the other of the intersection line between the second extension portion and the third extension portion and the intersection line between the third extension portion and the fourth extension portion is disposed parallel to the Y axis.

3. A photographing apparatus set forth in claim 1, wherein the second extension portion and the forth extension portion are configured parallel to a YZ plane and an XZ plane, respectively, and the third extension portion is configured to a circular sector shape with a central angle of roughly 90 degrees.

4. A photographing apparatus set forth in claim 2, wherein the second extension portion and the forth extension portion are configured parallel to a YZ plane and an XZ plane, respectively, and the third extension portion is configured to a circular sector shape with a central angle of roughly 90 degrees.

5. A photographing apparatus set forth in claim 1, wherein the connection extension section is configured to branch into a first connection extension portion and a second connection extension portion which are overlapped to form a roughly same shape including a first, second, third and fourth extension parts, respectively.

6. A photographing apparatus set forth in claim 2, wherein the connection extension section is configured to branch into a first connection extension portion and a second connection extension portion which are overlapped to form a roughly same shape including a first, second, third and fourth extension parts, respectively.

7. A photographing apparatus, comprising:

an image-blur suppression mechanism which moves a photographing element on a photographing plane of which a subject image is formed in an XY plane which is parallel to the photographing plane to follow a displacement of the subject image caused by a camera shake based on a target value obtained by setting an intersection point of a Z axis which is a photographing optical axis and the photographing plane which is perpendicular to the Z axis as a zero point to calculate a displacement amount of the subject image which is caused by the camera shake detected on a main body from the zero point as the target value, the XY plane being a plane including X and Y axes perpendicular to the Z axis, respectively;

a fixing member to fix the image-blur suppression mechanism in the main body;

a computation device which is provided in the main body to process signals from the photographing element and drive the image-blur suppression mechanism; and a flexible base plate which is configured to connect the photographing element to the computation device electrically, wherein the image-blur suppression mechanism includes a guide mechanism configured to guide the photographing element in a direction of each of the X and Y axes, wherein the flexible base plate includes a photographing element connection section connected to the photographing element, a computation device connection section connected to the computation device, and a connection extension section to connect the photographing element connection section to the computation device connection section;

the connection extension section has a first extension portion which is extended along the XY plane starting from the one end, a second extension portion which is connected to the first extension portion extending toward the subject viewing from the photographing element, a third extension portion which is connected to the second extension portion extending parallel to the XY plane, and a fourth extension portion which is connected to the third extension portion extending in a direction away from the subject viewing from the photographing element;

the connection extension section is folded through a plastic deformation to form a folding line between the first and second extension portions, the second and third extension portions, the third and fourth extension portions, and the fourth extension portion and the other end, respectively; and wherein one of an intersection line between the second extension portion and the third extension portion and an intersection line between the third extension portion and the fourth extension portion is disposed parallel to the X axis and the other of the intersection line between the second extension portion and the third extension portion and the intersection line between the third extension portion and the fourth extension portion is disposed parallel to the Y axis.

8. A photographing apparatus, comprising:

an image-blur suppression mechanism which moves a photographing element on a photographing plane of which a subject image is formed in an XY plane which is parallel to the photographing plane to follow a displacement of the subject image caused by a camera shake based on a target value obtained by setting an intersection point of a Z axis which is a photographing optical axis and the photographing plane which is perpendicular to the Z axis as a zero point to calculate a displacement amount of the subject image which is caused by the camera shake detected on a main body from the zero point as the target value, the XY plane being a plane including X and Y axes perpendicular to the Z axis, respectively;

a fixing member which is provided to fix the image-blur suppression mechanism in the main body;

a computation device which is provided in the main body to process signals from the photographing element and drive the image-blur suppression mechanism; and a flexible base plate which is configured to connect the photographing element to the computation device electrically, wherein the image-blur suppression mechanism includes a guide mechanism configured to guide the photographing element in a direction of each of the X and Y axes, wherein the flexible base plate includes a photographing element connection section connected to the photographing element, a computation device connection section connected to the computation device, and a connection extension section to connect the photographing element connection section to the computation device connection section;

the connection extension section has a first extension portion which is extended along the XY plane starting from the one end, a second extension portion which is connected to the first extension portion extending in a direction away from the subject viewing from the photographing element, a third extension portion which is connected to the second extension portion extending parallel to the XY plane, and a fourth extension portion which is connected to the third extension portion extending toward the subject viewing from the photographing element;

the connection extension section is folded through a plastic deformation to form a folding line between the first and second extension portions, the second and third extension portions, the third and fourth extension portions, and the fourth extension portion and the other end, respectively; and wherein one of an intersection line between the second extension portion and the third extension portion and an intersection line between the third extension portion and the fourth extension portion is disposed parallel to the X axis and the other of the intersection line between the second extension portion and the third extension portion and the intersection line between the third extension portion and the fourth extension portion is disposed parallel to the Y axis.

9. A photographing apparatus set forth in claim 7, wherein the second extension portion and the forth extension portion are configured parallel to an YZ plane and an XZ plane, respectively, and the third extension portion is configured to a circular sector shape with a central angle of roughly 90 degrees.

10. A photographing apparatus set forth in claim 8, wherein the second extension portion and the forth extension portion are configured parallel to an YZ plane and an XZ plane, respectively, and the third extension portion is configured to a circular sector shape with a central angle of roughly 90 degrees.

11. A photographing apparatus set forth in claim 7, wherein the connection extension section is configured to branch into a first connection extension section and a second connection extension section which are overlapped to form a roughly same shape including the first, second, third and fourth extension portions, respectively.

12. A photographing apparatus set forth in claim 8, wherein the connection extension section is configured to branch into a first connection extension section and a second connection extension section which are overlapped to form a roughly same shape including the first, second, third and fourth extension portions, respectively.

13. A photographing apparatus set forth in claim 7, wherein the fixing member is a holding tube to house at the photographing optical axis a lens barrel on an end portion of which the photographing element is disposed; the photographing element connection section is connected to a plane opposite to the photographing plane and the connection extension section is disposed along an outer circumferential surface of the fixed tube.

14. A photographing apparatus set forth in claim 8, wherein the fixing member is a holding tube to house at the photographing optical axis a lens barrel on an end portion of which the photographing element is disposed; the photographing element connection section is connected to a plane opposite to the photographing plane and the connection extension section is disposed along an outer circumferential surface of the fixed tube.

15. A photographing apparatus set forth in claim 1, wherein the image-blur suppression mechanism includes a mount stage for mounting the photographing element thereon and enables the photographing element to follow the displacement of the subject image by moving the mounting stage along the XY plane.

16. A photographing apparatus set forth in claim 2, wherein the image-blur suppression mechanism includes a mount stage for mounting the photographing element thereon and enables the photographing element to follow the displacement of the subject image by moving the mounting stage along the XY plane.

17. A photographing apparatus set forth in claim 7, wherein the image-blur suppression mechanism includes a mount stage for mounting the photographing element thereon and enables the photographing element to follow the displacement of the subject image by moving the mounting stage along the XY plane.

18. A photographing apparatus set forth in claim 8, wherein the image-blur suppression mechanism includes a mount stage for mounting the photographing element thereon and enables the photographing element to follow the displacement of the subject image by moving the mounting stage along the XY plane.

19. A photographing apparatus according to claim 1, wherein the guide mechanism includes an X direction stage fixed to the main body, a Y direction stage attached to the X direction stage to move in a direction of the X axis, and a mount stage attached to the Y direction stage to move in a direction of the Y axis and configured to mount the photographing element so that the photographing element is configured to be moved in a direction of each of the X and Y axes.

20. A photographing apparatus according to claim 19, wherein the Y direction stage is attached to the X direction stage through a pair of first guide shafts, and the mount stage is attached to the Y direction stage through a pair of second guide shafts which are disposed perpendicularly to the first guide shafts.

* * * * *

UNITED STATES PATENT AND TRADEMARK OFFICE
CERTIFICATE OF CORRECTION

PATENT NO. : 7,643,750 B2  Page 1 of 1
APPLICATION NO. : 11/583904
DATED : January 5, 2010
INVENTOR(S) : Irisawa et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 434 days.

Signed and Sealed this

Twenty-first Day of December, 2010

David J. Kappos
*Director of the United States Patent and Trademark Office*